(12) United States Patent
Swazey et al.

(10) Patent No.: US 9,628,811 B2
(45) Date of Patent: Apr. 18, 2017

(54) ADAPTIVE GROUP OF PICTURES (AGOP) STRUCTURE DETERMINATION

(75) Inventors: Scott T. Swazey, San Diego, CA (US); Seyfullah Halit Oguz, San Diego, CA (US); Amit Rohatgi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1846 days.

(21) Appl. No.: 11/957,582

(22) Filed: Dec. 17, 2007

(65) Prior Publication Data
US 2009/0154816 A1 Jun. 18, 2009

(51) Int. Cl.
*G06K 9/36* (2006.01)
*H04N 19/40* (2014.01)
(Continued)

(52) U.S. Cl.
CPC ........... *H04N 19/40* (2014.11); *H04N 19/114* (2014.11); *H04N 19/142* (2014.11);
(Continued)

(58) Field of Classification Search
CPC .. H04N 19/114; H04N 19/142; H04N 19/177; H04N 19/40; H04N 19/61; H04N 19/87
(Continued)

(56) References Cited

U.S. PATENT DOCUMENTS 5,508,750 A * 4/1996 Hewlett et al. ............... 348/558
5,754,233 A * 5/1998 Takashima ............. H04N 19/87
348/390.1

(Continued)

FOREIGN PATENT DOCUMENTS

CN 1954601 A 4/2007
CN 101014125 A 8/2007
(Continued)

OTHER PUBLICATIONS

"New Enhancements to Cut, Fade, and Dissolve Detection Processes in Video Segmentation",Truong et al.,(hereafter Truong), ACM, Published in 2000, pp. 219-227.*
(Continued)

*Primary Examiner* — Mekonen Bekele
(74) *Attorney, Agent, or Firm* — Elaine H. Lo

(57) ABSTRACT

This disclosure is directed to techniques for determining a picture type for each of a plurality of frames included in a video sequence based on cross-correlations between the frames. The cross-correlations include first order cross-correlations between image information within pairs of frames included in the video sequence and second order cross-correlations between pairs of the first order cross-correlations. The first order cross-correlations may be analyzed to detect video transitional effects between the frames. The first and second order cross-correlations may be comparatively analyzed to determine temporal similarities between the frames. Therefore, the correlation-based determination techniques determine picture types for the frames based on the video transitional effects and the temporal similarities. The correlation-based determination techniques may calculate the first order cross-correlations between images within pairs of frames, or between sets of subimages within pairs of frames that are then averaged over the subimages for each of the pairs of frames.

100 Claims, 17 Drawing Sheets

(51) Int. Cl.
*H04N 19/61* (2014.01)
*H04N 19/114* (2014.01)
*H04N 19/142* (2014.01)
*H04N 19/177* (2014.01)
*H04N 19/87* (2014.01)

(52) U.S. Cl.
CPC .......... *H04N 19/177* (2014.11); *H04N 19/61* (2014.11); *H04N 19/87* (2014.11)

(58) Field of Classification Search
USPC .............. 382/236, 232; 375/240.27, 240.26, 375/E07.279, E07.078
See application file for complete search history.

(56) References Cited

U.S. PATENT DOCUMENTS

| | | | | |
|---|---|---|---|---|
| 5,767,922 | A * | 6/1998 | Zabih et al. | 348/700 |
| 5,801,765 | A * | 9/1998 | Gotoh et al. | 348/155 |
| 6,580,829 | B1 * | 6/2003 | Hurst, Jr. | H04N 19/85 348/456 |
| 6,671,453 | B2 * | 12/2003 | Yagura et al. | 386/230 |
| 6,771,825 | B1 | 8/2004 | Hurst, Jr. | |
| 6,959,044 | B1 * | 10/2005 | Jin | H04N 19/172 348/699 |
| 7,548,259 | B2 * | 6/2009 | Batchvarov | 348/218.1 |
| 7,664,175 | B1 * | 2/2010 | Chupp et al. | 375/240.27 |
| 2004/0125877 | A1 * | 7/2004 | Chang | G06F 17/30787 375/240.28 |
| 2006/0239347 | A1 * | 10/2006 | Koul | 375/240.12 |
| 2007/0071398 | A1 * | 3/2007 | Raveendran et al. | 386/68 |
| 2007/0104382 | A1 * | 5/2007 | Jasinschi | 382/254 |
| 2007/0242080 | A1 * | 10/2007 | Hamada et al. | 345/606 |
| 2009/0003430 | A1 * | 1/2009 | Sun et al. | 375/240.01 |
| 2009/0109341 | A1 * | 4/2009 | Oguz et al. | 348/625 |

FOREIGN PATENT DOCUMENTS

| | | | | |
|---|---|---|---|---|
| JP | 2004288222 | A | 10/2004 | |
| JP | 2007520762 | A | 7/2007 | |
| JP | 2007208989 | A | 8/2007 | |
| JP | 2007300455 | A | 11/2007 | |
| TW | 238650 | A * | 11/2004 | ............... H04N 1/64 |
| TW | 238650 | | 8/2005 | |
| WO | WO2006003808 | A1 | 1/2006 | |
| WO | WO2007047755 | | 4/2007 | |
| WO | WO 2007047755 | A1 * | 4/2007 | ............... H04N 7/50 |
| WO | WO2007072543 | A1 | 6/2007 | |

OTHER PUBLICATIONS

Wiegand, et al., "Joint Draft 6: Scalable Video Coding," JVT-S 201, Apr. 2006, Geneva.
Wiegand, et al., "Joint Draft 9 of SVC Amendment," JVT-V 201, Jan. 2007, Marrakech, Morocco.
Dumitras A et al: "I/P/B frame type decision by collinearity of displacements" Image Processing, 2004. ICIP "04. 2004 International Conference on Singapore Oct. 24-27, 2004, Piscataway, NJ, USA, IEEE, vol. 4, Oct. 24, 2004 (Oct. 24, 2004), pp. 2769-2772, XP010786362 ISBN: 978-0-7803-8554-2 * the whole document *.
International Prleiminary Report on Patentability—PCT/2008/087256, International Search Authority—European Patent Office—Apr. 6, 2010.
International Search Report and Written Opinion—PCT/US2008/087256, International Search Authority—European Patent Office—May 25, 2009.
European Search Report—EP08006312—Search Authority—Munich—Jul. 14, 2009.
Taiwan Search Report—TW097148811—TIPO—Mar. 5, 2013.

* cited by examiner

ADAPTIVE GROUP OF PICTURES (AGOP) STRUCTURE DETERMINATION

TECHNICAL FIELD

The invention relates to coding of video data and, more particularly, to adaptively determining a group of pictures (GOP) structure of the video data.

BACKGROUND

A number of different video coding standards have been established for coding digital video sequences. The Moving Picture Experts Group (MPEG), for example, has developed a number of standards including MPEG-1 (Part 2), MPEG-2 (Part 2) and MPEG-4 (Part 2). Other examples include the International Telecommunication Union (ITU-T) H.261 and H.263 standards, and the ITU-T H.264 standard, which is also set forth in MPEG-4 Part 10, entitled "Advanced Video Coding, AVC." These video coding standards generally support improved transmission and storage efficiency of video sequences by coding data in a compressed manner. Compression reduces the overall amount of data that needs to be transmitted or stored for effective transmission or storage of video frames. Video coding is used in many contexts, including video streaming, video camcorder, personal video recorder (PVR), digital video recorder (DVR), video telephony (VT), video conferencing, digital video distribution on video CD (VCD) and digital versatile/video disc (DVD), and video broadcast applications, over both wired and wireless transmission media and on both magnetic and optical storage media.

The MPEG1, MPEG-2, MPEG-4, ITU-T H.261, ITU-T H.263, and ITU-T H.264 standards support video coding techniques that utilize similarities between successive video frames, referred to as temporal or inter-frame correlation, to provide inter-frame compression. These standards also support video coding techniques that utilize similarities within individual video frames, referred to as spatial or intra-frame correlation, to provide intra-frame compression. The inter-frame compression techniques exploit data redundancy across adjacent or closely spaced video frames by converting pixel-based representations of video frames to pixel-block-based translational motion representations. Video frames coded using inter-frame techniques are often referred to as P ("predicted") frames or B ("bi-predictive") frames. Some frames, commonly referred to as I ("intra") frames, are coded using spatial compression, which can be either non-predictive (i.e., based only on transform coding as in pre-H.264 standards) or predictive (i.e., based on both spatial prediction and transform coding as in H.264). In addition, some frames may include a combination of both intra- and inter-coded blocks. These encoding standards provide highly efficient coding that is well suited to wireless video broadcasting applications.

Prior to performing encoding using any of the efficient encoding standards mentioned above, a coding device may partition a received video sequence into group of pictures (GOP) structures that include a plurality of frames. The coding device may then determine the picture coding type for each of the frames included in the GOP structures before encoding the video data for transmission or storage. Determination of the GOP structure with picture coding types is important for coding efficiency. Therefore, not only encoding schemes that act on previously uncompressed raw video data benefit from GOP structure determination. Transcoding schemes that act on previously compressed video data may also benefit. For example, some video data desired for wireless video broadcasting, e.g., digital television signals, are, in their original form, coded using video encoding standards such as MPEG-2 (Part 2) that do not provide the currently most efficient compression. In this case, a transcoder may convert the video data to an encoding standard that does provide more efficient compression, such as ITU-T H.264, for wireless video broadcasting. In order to convert the video data, a transcoder may first decode the video data from the first encoding standard and then may partition the video sequence into GOP structures and perform GOP structure determination before re-encoding the video data using the second encoding standard more desirable for wireless video broadcasting.

As the video signal changes its statistical nature over time, the coding device should adapt the GOP structure in order to exploit the available temporal redundancy to the fullest extent possible for the most efficient compression. In general, a coding device adaptively determines the picture coding type for a candidate frame within a GOP structure based on the content of surrounding frames and identification of video transitional effects, such as cut scene changes, flash frames, cross-fades, and camera pans and scrolls. Existing adaptive GOP (AGOP) structure determination methods include analysis of statistical features of both luminance and chrominance signals using histograms or variance measures, edge determination based algorithms, and algorithms based on motion vector field evolution or temporal prediction efficiency metrics. However, existing AGOP structure determination methods may not be accurate enough to achieve the efficient compression needed for increasingly complex wireless video broadcasting applications.

SUMMARY

In general, this disclosure is directed to techniques for determining a picture coding type for each of a plurality of frames included in a video sequence based on cross-correlations between the frames. More specifically, the techniques may adaptively determine picture types for frames included in a group of pictures (GOP) structure based on cross-correlations between the frames. The cross-correlations include first order cross-correlations between image information within pairs of frames included in the video sequence and second order cross-correlations between pairs of the first order cross-correlations. The first order cross-correlations may be analyzed to detect video transitional effects between the frames. The first and second order cross-correlations may be comparatively analyzed to determine temporal similarities between neighboring frames. Therefore, the correlation-based determination techniques determine picture types for the frames as either P ("predicted"), B ("bi-predictive"), or I ("intra") pictures based on the video transitional effects and the temporal similarities.

In one aspect, an image correlation-based determination technique calculates the first order cross-correlations between images within pairs of frames included in the video sequence. The image correlation-based determination technique may determine picture types for full frames. In another aspect, a subimage correlation-based determination technique calculates the first order cross-correlations between sets of subimages, e.g., macroblocks, within pairs of frames included in the video sequence and averages the cross-correlations over all or a portion of the subimages for each of the pairs of frames. In addition, each of the frames included in the video sequence may be divided into multiple slices such that the subimage correlation-based determination technique may determine picture types for the individual slices of each of the frames.

The techniques described herein may be executed within a correlation-based adaptive group of pictures (AGOP) structure determination module utilized by a real-time or non-real-time coding device. In some aspects, the correlation-based AGOP structure determination module may be used as an offline benchmark against which other AGOP structure determination methods implemented in a real-time coding device may be compared. In other aspects, the correlation-based AGOP structure determination module may be implemented in a real-time or non-real-time coding device. In the case of a real-time coding device, the correlation-based AGOP structure determination module may be implemented with appropriate complexity reductions to enable real-time determination of picture types.

As an example, the correlation-based AGOP structure determination module may be utilized by a real-time or non-real-time transcoder for re-encoding previously compressed video data. The transcoder may re-encode the video data with an encoding standard that provides efficient inter-frame and intra-frame compression, such as ITU-T H.264. The techniques may be especially useful for wireless video broadcasting applications that require highly efficient data compression. As another example, the correlation-based AGOP structure determination module may be utilized by a real-time or non-real-time, single-pass or multi-pass video encoder acting on previously uncompressed raw video data.

In one aspect, this disclosure provides a method comprising calculating first order cross-correlations between image information within pairs of frames included in a video sequence and calculating second order cross-correlations between pairs of the first order cross-correlations. The method further comprises determining a picture type for each of the frames included in the video sequence based on the first and second order cross-correlations.

In another aspect, this disclosure provides a device comprising a correlator that calculates first order cross-correlations between image information within pairs of frames included in a video sequence, and calculates second order cross-correlations between pairs of the first order cross-correlations. The device also includes a picture type determination module that determines a picture type for each of the frames included in the video sequence based on the first and second order cross-correlations.

In another aspect, this disclosure provides a computer program product comprising computer-readable medium comprising instructions. The instructions cause a computer to calculate first order cross-correlations between image information within pairs of frames included in a video sequence, calculate second order cross-correlations between pairs of the first order cross-correlations, and determine a picture type for each of the frames included in the video sequence based on the first and second order cross-correlations.

In a further aspect, this disclosure provides a device comprising means for calculating first order cross-correlations between image information within pairs of frames included in a video sequence and second order cross-correlations between pairs of the first order cross-correlations. The device also comprises means for determining a picture type for each of the frames included in the video sequence based on the first and second order cross-correlations.

In another aspect, this disclosure provides a wireless communication device handset comprising a correlator that calculates first order cross-correlations between image information within pairs of frames included in a video sequence, and calculates second order cross-correlations between pairs of the first order cross-correlations. The handset further comprises a picture type determination module that determines a picture type for each of the frames included in the video sequence based on the first and second order cross-correlations.

In a further aspect, this discloser provides an integrated circuit device for processing digital image data comprising at least one processor that is configured to calculate first order cross-correlations between image information within pairs of frames included in a video sequence, calculate second order cross-correlations between pairs of the first order cross-correlations, and determine a picture type for each of the frames included in the video sequence based on the first and second order cross-correlations.

In an additional aspect, this disclosure provides a system comprising a coding device including a GOP partitioner that partitions video data into GOP structures including a plurality of frames, and an AGOP structure determination module that determines picture types for the frames included in the GOP structures in real-time. The system also includes a correlation-based AGOP structure determination module positioned external to the transcoder that determines benchmark picture types for the frames included in the GOP structures based on first order cross-correlations between image information within pairs of frames and second order cross-correlations between pairs of first order cross-correlations. The system further comprises a benchmark comparator that compares the picture types against the benchmark picture types to determine accuracy of the AGOP structure determination module integrated in the coding device.

In another aspect, this disclosure provides a coding device comprising a GOP partitioner that partitions video data into GOP structures including a plurality of frames. The coding device also comprises a correlation-based AGOP structure determination module that determines picture types for the frames included in the GOP structures in real-time based on first order cross-correlations between image information within pairs of frames and second order cross-correlations between pairs of first order cross-correlations. In one case, the coding device may comprise a real-time or non-real-time transcoder acting on previously compressed video data. In another case, the coding device may comprise a real-time or non-real-time encoder acting on previously uncompressed raw video data.

The techniques described in this disclosure may be implemented in hardware, software, firmware, or any combination thereof. If implemented in software, the software may be executed in a computer. The software may be initially stored as instructions, program code, or the like. Accordingly, the disclosure also contemplates a computer program product for processing video data comprising a computer-readable medium, wherein the computer-readable medium comprises instructions for causing a computer to execute techniques and functions according to this disclosure. Alternatively, if implemented in hardware, such hardware implementations may be digital, analog, or both. Aspects of this disclosure may be embodied in the computer-readable medium or a computer program product that comprises the computer-readable medium. The computer program product may include packaging materials.

Additional details of various examples are set forth in the accompanying drawings and the description below. Other features, objects, advantages and examples will become apparent from the description and drawings, and from the claims.

DETAILED DESCRIPTION

Figure 1:
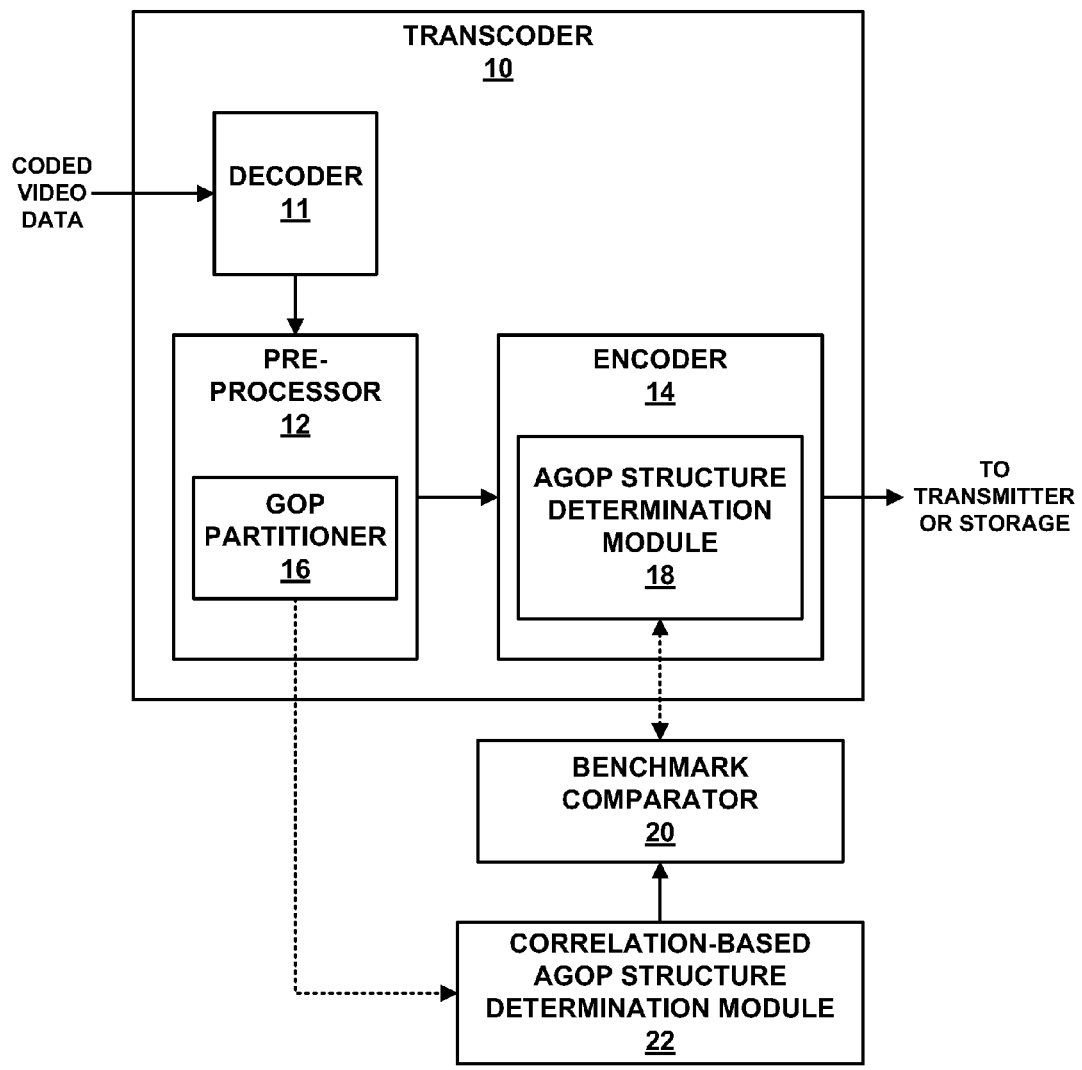
FIG. 1 is a block diagram illustrating an exemplary implementation of a correlation-based AGOP structure determination module as an offline benchmark against which an AGOP structure determination module implemented in a real-time transcoder may be compared.

This disclosure describes techniques for determining a picture type for each of a plurality of frames included in a video sequence based on cross-correlations between the frames. The cross-correlations include first order cross-correlations between image information within pairs of frames included in the video sequence and second order cross-correlations between pairs of the first order cross-correlations. The first order cross-correlations may be analyzed to detect video transitional effects between the frames, such as cut scene changes, flash frames, cross-fades, and camera pans and scrolls. The first and second order cross-correlations may be comparatively analyzed to determine temporal similarities between the frames. Therefore, the correlation-based determination techniques determine picture types for the frames based on the video transitional effects and the temporal similarities. The correlation-based determination techniques may calculate the first order cross-correlation between images within pairs of frames, or between sets of subimages, e.g., macroblocks, within pairs of frames that are averaged over all or a portion of the subimages for each of the pairs of frames.

More specifically, the techniques may adaptively determine picture types for frames included in a group of pictures (GOP) structure based on cross-correlations between the frames. GOP structures partition long sequences of video data into manageable data sets based on intra- and inter-frame coding techniques. For example, GOP structures typically begin with an I ("intra") frame followed by P ("predicted") frames that refer to previous I and P frames, or B ("bi-predictive") frames that refer to previous and subsequent I and P frames. In some cases, GOP structures may be closed such that the frames included in the GOP structure form a self contained unit that may be completely decoded without reference to frames outside of the GOP structure. In other cases, GOP structures may be open such that frames included in the GOP structure may reference frames outside of the GOP structure.

The techniques described herein may be executed within a correlation-based adaptive group of pictures (AGOP) structure determination module capable of determining picture types for each of a plurality of frames included in a GOP structure and updating the GOP structure to specify the determined picture types for each of the frames. The correlation-based AGOP structure determination techniques described herein may, from a coding efficiency perspective, achieve high levels of accuracy when determining picture types for frames included in GOP structures and may be considered the "gold standard" for AGOP structure determination techniques. The output of the correlation-based AGOP determination module demonstrates the intuitive behavior of a temporal similarity metric, and provides information on correlation dynamics with high sensitivity. In addition, the performance of the correlation-based AGOP determination module is heavily dependent on frame content, rate-distortion optimization characteristics, and encoding bandwidth regime characteristics.

FIG. 1 is a block diagram illustrating an exemplary implementation of a correlation-based AGOP structure determination module 22 as an offline benchmark against which an AGOP structure determination module 18 implemented in a real-time transcoder 10 may be compared. Transcoder 10 may be formed at least in part as one or more integrated circuit devices, which may be referred to collectively as an integrated circuit device. In some aspects, transcoder 10 may form part of a wireless communication device handset, such as a mobile telephone. As illustrated in FIG. 1, transcoder 10 includes a decoder 11, a pre-processor 12 and an encoder 14. Pre-processor 12 includes a GOP partitioner 16 and encoder 14 includes AGOP structure determination module 18. In other implementations, the functions of AGOP structure determination module 18 may be divided between pre-processor 12 and encoder 14.

Transcoder 10 receives a video sequence from a video data provider that includes coded video data. The video sequence may comprise video data coded using a video encoding standard that does not support algorithms which most effectively utilize similarities between successive frames or within a single frame. For example, the video sequence may comprise digital television data encoded using MPEG-2 (Part 2), which does not provide the currently most efficient inter-frame and intra-frame compression. However, many video applications, especially wireless video broadcasting applications, require the highly efficient data compression provided by more advanced encoding standards, such as ITU-T H.264, that exploit data redundancy across frames and within frames by more sophisticated algorithms. Therefore, transcoder 10 may convert the video sequence to another more advanced encoding standard. For example, transcoder 10 may re-encode the video sequence to prepare the video frames for wireless video broadcasting, efficient storage, or other applications or services that desire highly efficient data compression.

In order to convert the video sequence, decoder 11 decodes the video sequence from the less efficient original coding standard. GOP partitioner 16 within pre-processor 12 then partitions the decoded video sequence into GOP structures that include a plurality of frames. GOP partitioner 16 may partition the decoded video sequence into groups of frames in accordance with a predetermined GOP structure size based on a random access enabling uniform I frame interval for the video sequence, or in accordance with a random positioning of the random access enabling I frames within the video sequence. For example, GOP partitioner 16 may partition the decoded video sequence into groups of approximately thirty frames with each group beginning with an I frame.

AGOP structure determination module 18 within encoder 14 determines a picture type for each of the frames included in the GOP structures generated by GOP partitioner 16. AGOP structure determination module 18 may execute any non-correlation-based AGOP structure determination technique. For example, AGOP structure determination module 18 may perform analysis of statistical features of both luminance and chrominance signals using histograms or variance measures, edge determination based algorithms, or algorithms based on motion vector field evolution or temporal prediction efficiency metrics to determine picture types for frames included in GOP structures. Encoder 14 then re-encodes the frames using a desired encoding standard and sends the re-encoded frames to a transmitter for wireless video broadcasting, a storage device for storage, or other apparatuses for applications or services that desire highly efficient data compression.

In accordance with an aspect of this disclosure, correlation-based AGOP structure determination module 22 may be positioned external to transcoder 10 as an offline benchmark against which AGOP structure determination module 18 implemented in transcoder 10 may be compared. Correlation-based AGOP structure determination module 22 determines a benchmark picture type for each of the frames included in the GOP structures generated by GOP partitioner 16 based on cross-correlations between the frames.

The cross-correlation calculations performed by correlation-based AGOP structure determination module 22 may include first order cross-correlations between image information within pairs of frames included in the GOP structures and second order cross-correlations between pairs of the first order cross-correlations. The first order cross-correlation calculations may be calculated in the pixel domain. The first order cross-correlations may be analyzed to detect video transitional effects between the frames. The first and second order cross-correlations may be comparatively analyzed to determine temporal similarities between neighboring frames. In this way, correlation-based AGOP structure determination module 22 determines picture types for the frames based on the video transitions and the temporal similarities.

The video transitional effects refer to visual video effects that are used to transition from a current scene of a video sequence to another scene of the same video sequence or to another scene of another video sequence. In general, video transitional effects may be divided into three categories: compact support effects such as cut scene changes, shot boundaries and flash frames, extended support effects such as cross-fades and dissolves, and global motion effects such as camera pans and camera scrolls. The temporal similarities refer to the level of image content or detail repetition between a current frame and neighboring frames. Measuring the temporal similarities may help determine whether the current frame includes content appropriate for encoding as a P, B, or I picture. For example, if the current frame is not similar to any neighboring frames, the current frame should be encoded as an I picture. If the current frame is similar to a previous neighboring frame but not to a subsequent neighboring frame, the current frame should be encoded as a P picture If the current frame is similar to both a previous neighboring frame and a subsequent neighboring frame it should be encoded as either a P picture or a B picture.

In one aspect, correlation-based AGOP structure determination module 22 calculates the first order cross-correlation between images within pairs of frames included in the GOP structures. The first order image cross-correlations identify amounts of global, i.e., overall, similarity and global movement between the pairs of frames, but do not identify the movement which occurred within the frames at the smaller scale of subimages. In this case, correlation-based AGOP structure determination module 22 may determine picture types for full frames.

In another aspect, correlation-based AGOP structure determination module 22 calculates the first order cross-correlation between sets of subimages, e.g., macroblocks, within pairs of frames included in the GOP structures and averages the cross-correlations over all or a portion of the subimages for each of the pairs of frames. The first order subimage cross-correlations identify subimage similarity and amounts of movement between the pairs of frames and identify where the movement occurred within the frames. In this case, correlation-based AGOP structure determination module 22 pads each subimage in the set of subimages by adding padding pixels to achieve a common image size. In this way, correlation-based AGOP structure determination module 22 may cross-correlate each of the padded subimages within a first frame with a padded subimage of potentially different original size within a second frame. For example, a subimage may comprise a 16×16 macroblock that may be padded to a 64×64 image. In other examples, a subimage may comprise a 16×8, 8×16, 8×8 or smaller pixel block. Additionally, each of the frames included in the video sequence may be divided into multiple slices such that correlation-based AGOP structure determination module 22 may determine picture types for the individual slices of each of the frames.

Correlation-based AGOP structure determination module 22 achieves a high level of accuracy, from a coding efficiency perspective, when determining picture types for frames included in the GOP structures such that it may be considered a "gold standard" for evaluation of other AGOP determination techniques. Benchmark comparator 20 compares the picture types determined in real-time by AGOP structure determination module 18 against the benchmark picture types determined by correlation-based AGOP structure determination module 22 to determine the accuracy of AGOP structure determination module 18 integrated in real-time transcoder 10. In this way, changes to AGOP structure determination module 18 may be tested against the "gold standard" of correlation-based AGOP structure determination module 22 prior to implementation within transcoder 10.

Accurately determining picture types for the frames included the GOP structures reduces required encoding bit-rates and enables efficient compression of the frames. For example, accurately determining a GOP structure of I, P, and B frames allows encoder 14 to efficiently encode the frames by exploiting different redundancy types and dependency structures of the frames, utilizing appropriate sets of compression tools for the different complexities of the frames, and supporting application specific requirements such as channel switching for broadcast applications. In this way, encoder 14 may improve the rate-distortion tradeoff within transcoder 10. In addition, content dependent picture type determination enables encoder 14 to better utilize signal correlations for improved coding efficiency and better handling of video transitions.

Encoder 14 may operate according to a video compression standard, such as MPEG-2 (Part 2), MPEG-4 (Part 2), ITU-T H.263, or ITU-T H.264/MPEG-4 (Part 10) Advanced Video Coding (AVC). Although not shown in FIG. 1, in some aspects, encoder 14 may be integrated with an audio decoder and encoder and include appropriate MUX-DEMUX units, or other hardware and software, to handle encoding of both audio and video in a common data stream or as separate data streams. If applicable, MUX-DEMUX units may conform to the ITU-T H.223 multiplexer protocol, or other protocols such as the user datagram protocol (UDP).

The H.264/MPEG-4 Part 10 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced video coding for generic audiovisual services, by the ITU-T Study Group, and dated March 2005, which may be referred to herein as the H.264 standard or H.264 specification, or the H.264/AVC standard or specification.

The Joint Video Team (JVT) continues to work on a scalable video coding (SVC) extension to H.264/MPEG-4 AVC. The specification of the evolving SVC extension is in the form of a Joint Draft (JD). The Joint Scalable Video Model (JSVM) created by the JVT implements tools for use in scalable video coding, which may be used within transcoder 10 for various coding tasks described in this disclosure. Detailed information concerning Fine Granular Scalability (FGS) coding can be found in the Joint Draft documents, e.g., in Joint Draft 6 (SVC JD6), Thomas Wiegand, Gary Sullivan, Julien Reichel, Heiko Schwarz, and Mathias Wien, "Joint Draft 6: Scalable Video Coding," JVT-S 201, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, January 2007, Marrakech, Morocco.

In some aspects, for video broadcasting, the techniques described in this disclosure may be applied to enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast—terrestrial), or DMB (digital multimedia broadcasting). Hence, the video sequence of coded video data may be sent from a mobile wireless terminal, a video streaming server, or a video broadcast server. However, techniques described in this disclosure are not limited to any particular type of broadcast, multicast, unicast or other point-to-point system. In the case of broadcast, a video data provider may broadcast several channels of the coded video data to multiple receive devices.

Figure 2:
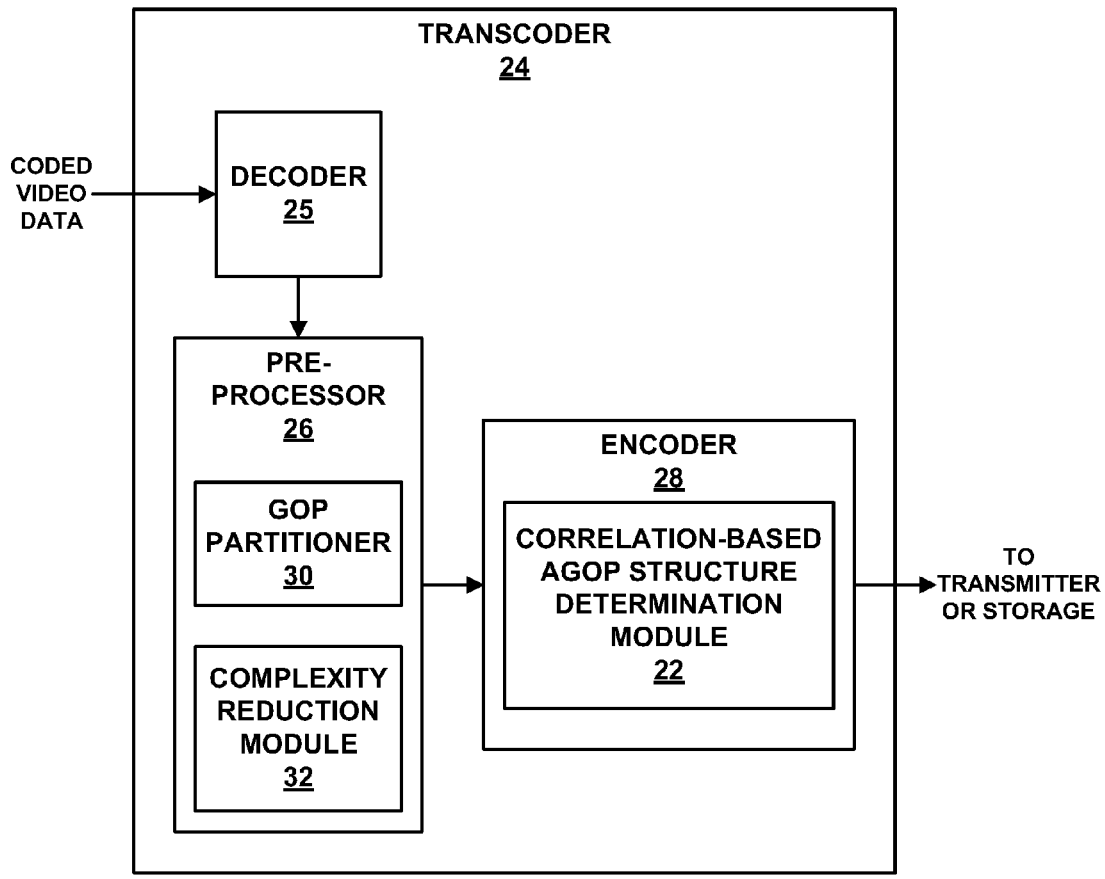
FIG. 2 is a block diagram illustrating an exemplary implementation of a correlation-based AGOP structure determination module implemented in a real-time transcoder.

FIG. 2 is a block diagram illustrating an exemplary implementation of correlation-based AGOP structure determination module 22 implemented in a real-time transcoder 24. In the example of FIG. 2, correlation-based AGOP structure determination module 22 is used for transcoding, instead of being used as a benchmark to evaluate a different GOP structure determination module, as in FIG. 1. Transcoder 24 may be formed at least in part as one or more integrated circuit devices, which may be referred to collectively as an integrated circuit device. In some aspects, transcoder 24 may form part of a wireless communication device handset, such as a mobile telephone.

As illustrated in FIG. 2, transcoder 24 includes a decoder 25, a pre-processor 26 and an encoder 28. Pre-processor 26 includes a GOP partitioner 30 and a complexity reduction module 32. Encoder 28 includes correlation-based AGOP structure determination module 22. In the implementation illustrated in FIG. 2, the entirety of correlation-based AGOP structure determination module 22 is included in encoder 28. In other implementations, the functions of correlation-based AGOP structure determination module 22 may be divided between pre-processor 26 and encoder 28. For example, correlation-based AGOP structure determination module 22 may calculate cross-correlations within pre-processor 26 and may perform correlation analysis and picture type determinations within encoder 28.

Transcoder 24 receives a video sequence from a video data provider that includes coded video data. As described above in reference to FIG. 1, the video sequence may comprise video data coded using a video encoding standard that does not support algorithms which most effectively utilize similarities between successive frames or within a single frame, e.g., digital television data encoded using MPEG-2 (Part 2). Transcoder 24 may convert the video sequence to another more advanced encoding standard, such as ITU-T H.264. For example, transcoder 24 may re-encode the video sequence to prepare the video frames for wireless video broadcasting, efficient storage, or other applications or services that desire highly efficient data compression.

In order to convert the video sequence, decoder 25 decodes the video sequence from the less efficient original coding standard. GOP partitioner 30 within pre-processor 26 then partitions the decoded video sequence into GOP structures that include a plurality of frames. GOP partitioner 30 may partition the decoded video sequence into groups of frames in accordance with a predetermined GOP size based on a random access enabling uniform I frame interval for the video sequence, or in accordance with a random positioning of the random access enabling I frames within the video sequence. For example, GOP partitioner 30 may partition the decoded video sequence into groups of approximately thirty frames with each group beginning with an I frame.

As described above in reference to FIG. 1, correlation-based AGOP structure determination module 22 may be considered a "gold standard" for AGOP determination techniques when the cross-correlation calculations are performed in non-real-time. Therefore, in the case where correlation-based AGOP structure determination module 22 is implemented within a non-real-time transcoder, correlation-based AGOP structure determination module 22 may determine picture types in non-real-time without any complexity reductions. However, in the aspect illustrated in FIG. 2, where transcoder 24 comprises a real-time transcoder, correlation-based AGOP structure determination module 22 implemented within transcoder 24 may be subject to complexity reductions to enable real-time determination of picture types.

In the implementation illustrated in FIG. 2, pre-processor 26 includes complexity reduction module 32 that performs certain complexity reductions to enable correlation-based AGOP structure determination module 22 to calculate the cross-correlation in real-time with a minimal loss of accuracy. For example, complexity reduction module 44 may reduce the resolution of image information within the frames included in the GOP structures. Complexity reduction module 32 may also limit a number of cross-correlation calculations that correlation-based AGOP structure determination module 22 may calculate when determining a picture type for any given frame. In some implementations, complexity reduction module 32 may perform other complexity reductions on either the video data or the real-time functions of correlation-based AGOP structure determination module 22.

Once complexity reduction module 44 has performed the necessary complexity reductions, correlation-based AGOP structure determination module 22 within encoder 24 determines a picture type in real-time for each of the frames included in the GOP structures generated by GOP partitioner 30 based on cross-correlations between the frames. Encoder 28 then re-encodes the frames using a desired encoding standard and sends the re-encoded frames to a transmitter for wireless video broadcasting, a storage device for storage, or other apparatuses for applications or services that desire highly efficient data compression.

Correlation-based AGOP structure determination module 22 operates as described above in reference to FIG. 1. In the example illustrated in FIG. 2, the operation of correlation-based AGOP structure determination module 22 may be subject to complexity reductions. However, the example illustrated in FIG. 2 is not intended to limiting. In other examples, transcoder 24 may include a software, hardware, and/or firmware platform powerful enough, in terms of supported number of computations per unit time performances, to implement correlation-based AGOP structure determination module 22 in real-time and without any complexity reductions.

The cross-correlations include first order cross-correlations between image information within pairs of frames included in the GOP structures and second order cross-correlations between pairs of the first order cross-correlations. The first order cross-correlations may be calculated in the pixel domain. The first order cross-correlations may be analyzed to detect video transitions between the frames. The first and second order cross-correlations may be comparatively analyzed to determine temporal similarities between neighboring frames. In this way, correlation-based AGOP structure determination module 22 determines picture types for the frames based on the video transitions and the temporal similarities.

In one aspect, correlation-based AGOP structure determination module 22 calculates the first order cross-correlations between images within pairs of frames included in the GOP structures. The first order image cross-correlations identify amounts of global, i.e., overall, similarity and global movement between the pairs of frames, but not the movement that occurred within the frames at the smaller scale of subimages. In this case, correlation-based AGOP structure determination module 22 may determine picture types for full frames.

In another aspect, correlation-based AGOP structure determination module 22 calculates the first order cross-correlations between sets of subimages, e.g., macroblocks, within pairs of frames included in the GOP structures and averages the cross-correlations over all or a portion of the subimages for each of the pairs of frames. The first order subimage cross-correlations identify subimage similarity and amounts of movement between the pairs of frames and identify where the movement occurred within the frames. In this case, correlation-based AGOP structure determination module 22 pads each subimage in the set of subimages by adding padding pixels to achieve a common image size. In this way, correlation-based AGOP structure determination module 22 may cross-correlate each of the padded subimages within a first frame with padded subimages of potentially different original size within a second frame. For example, a subimage may comprise a 16×16 macroblock that may be padded to a 64×64 image. In other examples, a subimage may comprise a 16×8, 8×16, 8×8 or smaller pixel block. Additionally, each of the frames included in the video sequence may be divided into multiple slices such that correlation-based AGOP structure determination module 22 may determine picture types for the individual slices of each of the frames.

Correlation-based AGOP structure determination module 22 enables accurate real-time determination, from a coding efficiency perspective, of picture types for frames included in the GOP structures. Accurately determining picture types for the frames included the GOP structures reduces encoding bit-rates and enables efficient compression of the frames. For example, accurately determining a GOP structure of I, P, and B frames allows encoder 28 to efficiently encode the frames by exploiting different redundancy types and dependency structures of the frames, utilizing appropriate sets of compression tools for the different complexities of the frames, and supporting application specific requirements such as channel switching for broadcast applications. In this way, encoder 28 may improve the rate-distortion tradeoff within transcoder 24. In addition, content dependent picture type determination enables encoder 28 to better utilize signal correlations for improved coding efficiency and better handling of video transitions. Encoder 28 may operate substantially similar to encoder 14 from FIG. 1. Hence, the video sequence of coded video data may be a mobile wireless terminal, a video streaming server, or a video broadcast server. In the case of broadcast, a video data provider may broadcast several channels of the coded video data to multiple receive devices.

In another aspect, transcoder 24 may include both correlation-based AGOP structure determination module 22 and an AGOP structure determination module, similar to AGOP structure determination module 18 from FIG. 1. In this way, transcoder 24 may utilize correlation-based AGOP structure determination module 22 when sufficient resources are available to determine picture types in real-time based on cross-correlations. However, when resources are lacking, transcoder 24 may instead utilize the non-correlation-based AGOP structure determination module, which may be faster but less accurate, for real-time determination of picture types.

Figure 3:
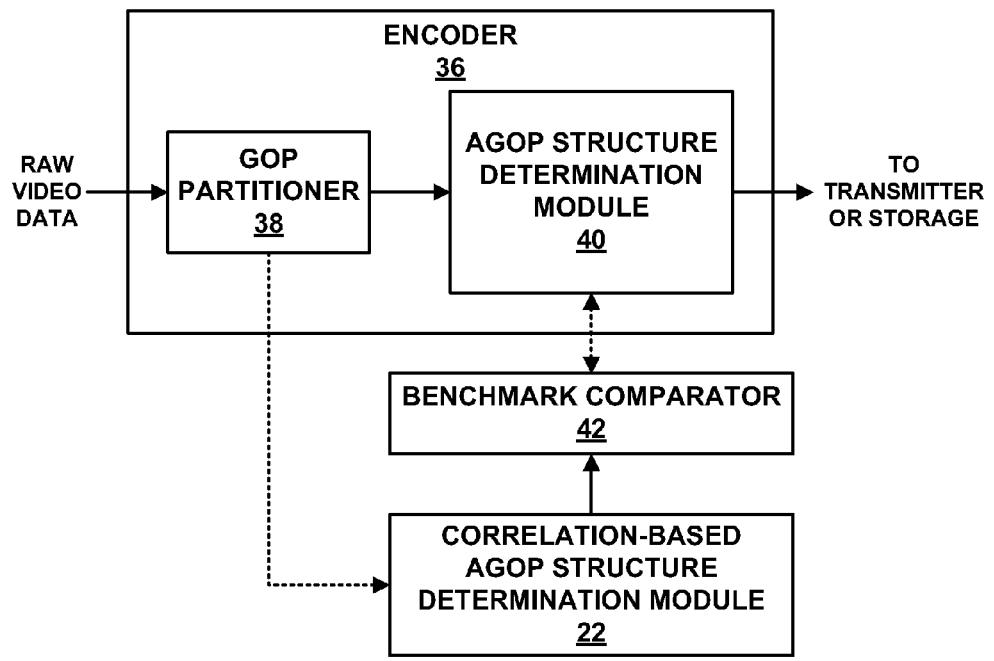
FIG. 3 is a block diagram illustrating an exemplary implementation of a correlation-based AGOP structure determination module as an offline benchmark against which an AGOP structure determination module implemented in a real-time encoder may be compared.

FIG. 3 is a block diagram illustrating an exemplary implementation of a correlation-based AGOP structure determination module 22 as an offline benchmark against which an AGOP structure determination module 40 implemented in a real-time encoder 36 may be compared. Encoder 36 may be formed at least in part as one or more integrated circuit devices, which may be referred to collectively as an integrated circuit device. In some aspects, encoder 36 may form part of a wireless communication device handset, such as a mobile telephone.

As illustrated in FIG. 3, encoder 36 includes a GOP partitioner 38 and AGOP structure determination module 40. Encoder 36 may comprise a single-pass or multi-pass video encoder. Encoder 36 may operate according to a video compression standard, such as MPEG-2 (Part 2), MPEG-4 (Part 2), ITU-T H.263, or ITU-T H.264/MPEG-4 (Part 10) Advanced Video Coding (AVC).

Encoder 36 receives a video sequence from a video data provider that includes previously uncompressed raw video data. Many video applications, especially wireless video broadcasting applications, require the highly efficient data compression provided by advanced encoding standards, such as ITU-T H.264, that exploit data redundancy across frames and within frames by more sophisticated algorithms. For example, encoder 36 may encode the video sequence to prepare the video frames for wireless video broadcasting, efficient storage, or other applications or services that desire highly efficient data compression.

In order to encode the video sequence, GOP partitioner 38 partitions the video sequence into GOP structures that include a plurality of frames. GOP partitioner 38 may partition the video sequence into groups of frames in accordance with a predetermined GOP structure size based on a random access enabling uniform I frame interval for the video sequence, or in accordance with a random positioning of the random access enabling I frames within the video sequence. For example, GOP partitioner 38 may partition the video sequence into groups of approximately thirty frames with each group beginning with an I frame. In other cases, GOP partitioner 38 may partition the video sequence into groups of frames in accordance with considerations based on the underlying transmission scheme's physical layer packetization and data burst characteristics. The presence of a statistical multiplexing scheme and its design may also influence the manner in which GOP partitioner 38 partitions the video sequence into groups of frames.

AGOP structure determination module 40 within encoder 36 determines a picture type for each of the frames included in the GOP structures generated by GOP partitioner 38. AGOP structure determination module 40 may execute any non-correlation-based AGOP structure determination technique. Encoder 36 then encodes the frames using a desired encoding standard and sends the encoded frames to a transmitter for wireless video broadcasting, a storage device for storage, or other apparatuses for applications or services that desire highly efficient data compression.

In accordance with an aspect of this disclosure, correlation-based AGOP structure determination module 22 may be positioned external to encoder 36 as an offline benchmark against which AGOP structure determination module 40 implemented in encoder 36 may be compared. Correlation-based AGOP structure determination module 22 determines a benchmark picture type for each of the frames included in the GOP structures generated by GOP partitioner 38 based on cross-correlations between the frames. Correlation-based AGOP structure determination module 22 operates as described above in reference to FIG. 1.

Correlation-based AGOP structure determination module 22 achieves a high level of accuracy, from a coding efficiency perspective, when determining picture types for frames included in the GOP structures such that it may be considered a "gold standard" for evaluation of other AGOP determination techniques. Benchmark comparator 42 compares the picture types determined in real-time by AGOP structure determination module 40 against the benchmark picture types determined by correlation-based AGOP structure determination module 22 to determine the accuracy of AGOP structure determination module 40 integrated in real-time encoder 36. In this way, changes to AGOP structure determination module 40 may be tested against the "gold standard" of correlation-based AGOP structure determination module 22 prior to implementation within encoder 36.

Figure 4:
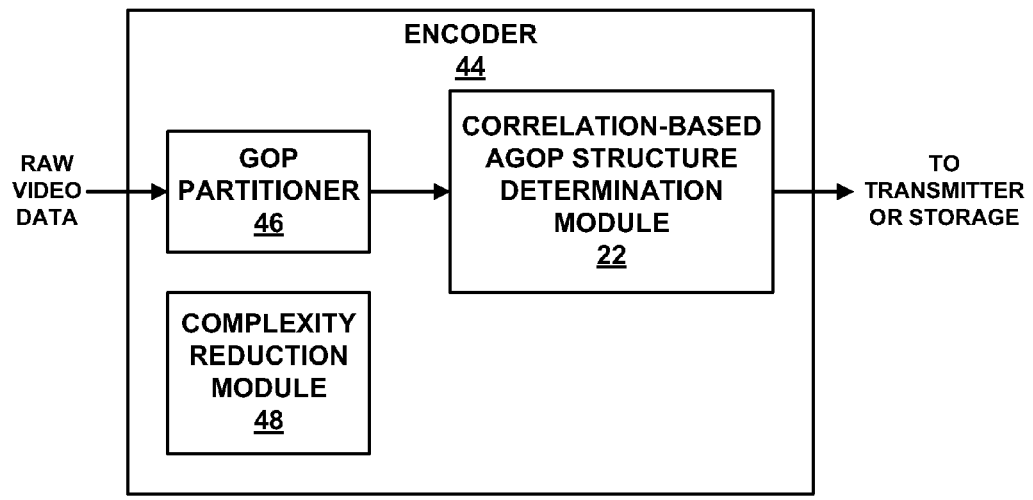
FIG. 4 is a block diagram illustrating an exemplary implementation of a correlation-based AGOP structure determination module implemented in a real-time encoder.

FIG. 4 is a block diagram illustrating an exemplary implementation of correlation-based AGOP structure determination module 22 implemented in a real-time encoder 44. In the example of FIG. 4, correlation-based AGOP structure determination module 22 is used for encoding, instead of being used as a benchmark to evaluate a different GOP structure determination module, as in FIG. 3. Encoder 44 may be formed at least in part as one or more integrated circuit devices, which may be referred to collectively as an integrated circuit device. In some aspects, encoder 44 may form part of a wireless communication device handset, such as a mobile telephone.

As illustrated in FIG. 4, encoder 44 includes a GOP partitioner 46, a complexity reduction module 48, and correlation-based AGOP structure determination module 22. Encoder 44 may comprise a single-pass or multi-pass video encoder. Encoder 44 may operate according to a video compression standard, such as MPEG-2 (Part 2), MPEG-4 (Part 2), ITU-T H.263, or ITU-T H.264/MPEG-4 (Part 10) Advanced Video Coding (AVC).

Encoder 44 receives a video sequence from a video data provider that includes previously uncompressed raw video data. Encoder 32 may encode the video sequence to prepare the video frames for wireless video broadcasting, efficient storage, or other applications or services that desire highly efficient data compression. In order to encode the video sequence, GOP partitioner 46 partitions the video sequence into GOP structures that include a plurality of frames. As described above, correlation-based AGOP structure determination module 22 may be considered a "gold standard" for AGOP determination techniques when the cross-correlation calculations are performed in non-real-time. Therefore, in the case where correlation-based AGOP structure determination module 22 is implemented within a non-real-time encoder, correlation-based AGOP structure determination module 22 may determine picture types in non-real-time without any complexity reductions. However, in the aspect illustrated in FIG. 4, where encoder 44 comprises a real-time encoder, correlation-based AGOP structure determination module 22 implemented within encoder 44 may be subject to complexity reductions to enable real-time determination of picture types.

In the implementation illustrated in FIG. 4, complexity reduction module 48 performs certain complexity reductions to enable correlation-based AGOP structure determination module 22 to perform the cross-correlation calculations in real-time with a minimal loss of accuracy. Complexity reduction module 48 operates substantially similar to complexity reduction module 32 within pre-processor 26 of transcoder 24 from FIG. 2.

Correlation-based AGOP structure determination module 22 operates as described above in reference to FIG. 1. In the example illustrated in FIG. 4, the operation of correlation-based AGOP structure determination module 22 may be subject to complexity reductions. However, the example illustrated in FIG. 4 is not intended to limiting. In other examples, encoder 44 may include a software, hardware, and/or firmware platform powerful enough, in terms of supported number of computations per unit time performances, to implement correlation-based AGOP structure determination module 22 in real-time and without any complexity reductions.

Figure 5:
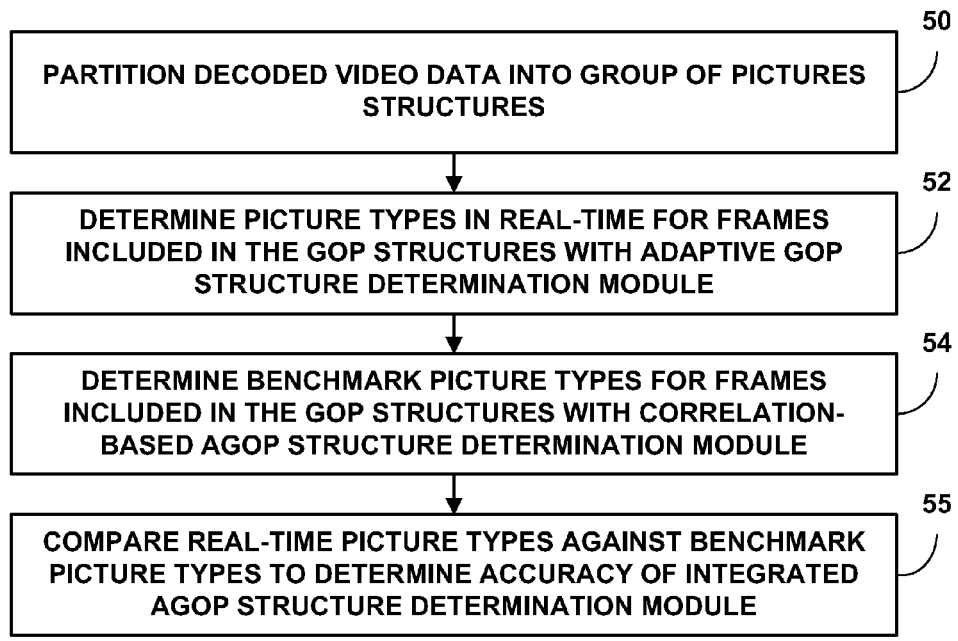
FIG. 5 is a flowchart illustrating an exemplary operation of the correlation-based AGOP structure determination module from FIGS. 1 and 3 as an offline benchmark utilized by a real-time coding device.

FIG. 5 is a flowchart illustrating an exemplary operation of correlation-based AGOP structure determination module 22 as an offline benchmark utilized by real-time transcoder 10. The flowchart of FIG. 5 will be described in relation to real-time transcoder 10 of FIG. 1. Once pre-processor 12 receives the decoded video data from decoder 11, GOP partitioner 16 partitions the video data into GOP structures, each including a plurality of frames (50).

AGOP structure determination module 18 implemented in real-time transcoder 10 determines in real-time the picture types for the frames included in the GOP structures (52). Correlation-based AGOP structure determination module 22 positioned external to real-time transcoder 10 determines benchmark picture types for frames included in the GOP structures (54). The output of correlation-based AGOP structure determination module 22 may be considered a "gold standard" of picture type determination techniques. Therefore, benchmark comparator 20 compares the real-time calculated picture types determined by AGOP structure determination module 18 against the benchmark picture types determined by correlation-based AGOP structure determination module 22 to determine accuracy of AGOP structure determination module 18 (55).

Figure 6:
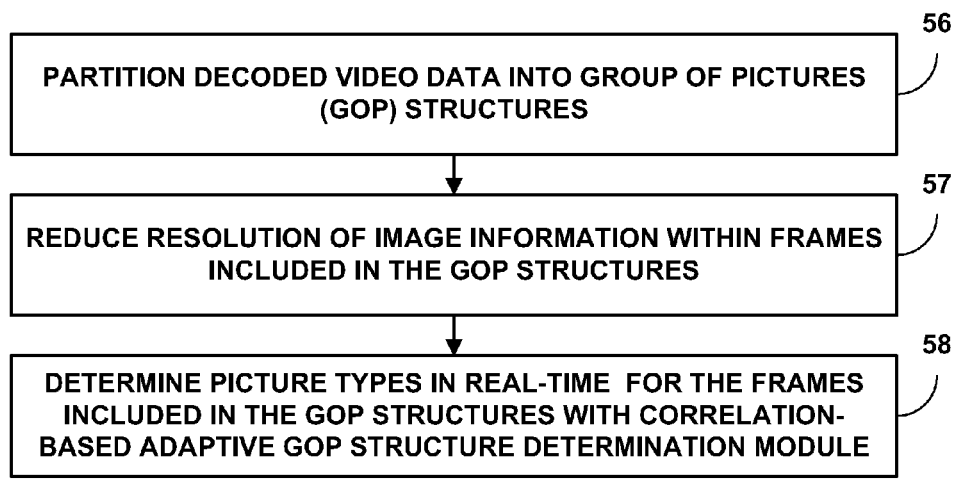
FIG. 6 is a flowchart illustrating an exemplary operation of the correlation-based AGOP structure determination module from FIGS. 2 and 4 implemented in a real-time or non-real-time coding device.

FIG. 6 is a flowchart illustrating an exemplary operation of correlation-based AGOP structure determination module 22 implemented in real-time transcoder 24. The flowchart of FIG. 6 will be described in relation to real-time transcoder 24 of FIG. 2. Once pre-processor 26 receives the decoded video data from decoder 25, GOP partitioner 30 partitions the video data into GOP structures, each including a plurality of frames (56).

Complexity reduction module 32 reduces the resolution of image information within the frames included in the GOP structures (57). In some cases, complexity reduction module 32 may also limit a number of cross-correlations correlation-based AGOP structure determination module 22 may calculate when determining a picture type for any given frame. Correlation-based AGOP structure determination module 22 implemented in real-time transcoder 24 then determines in real-time the picture types for the frames included in the GOP structures (58).

Figure 7:
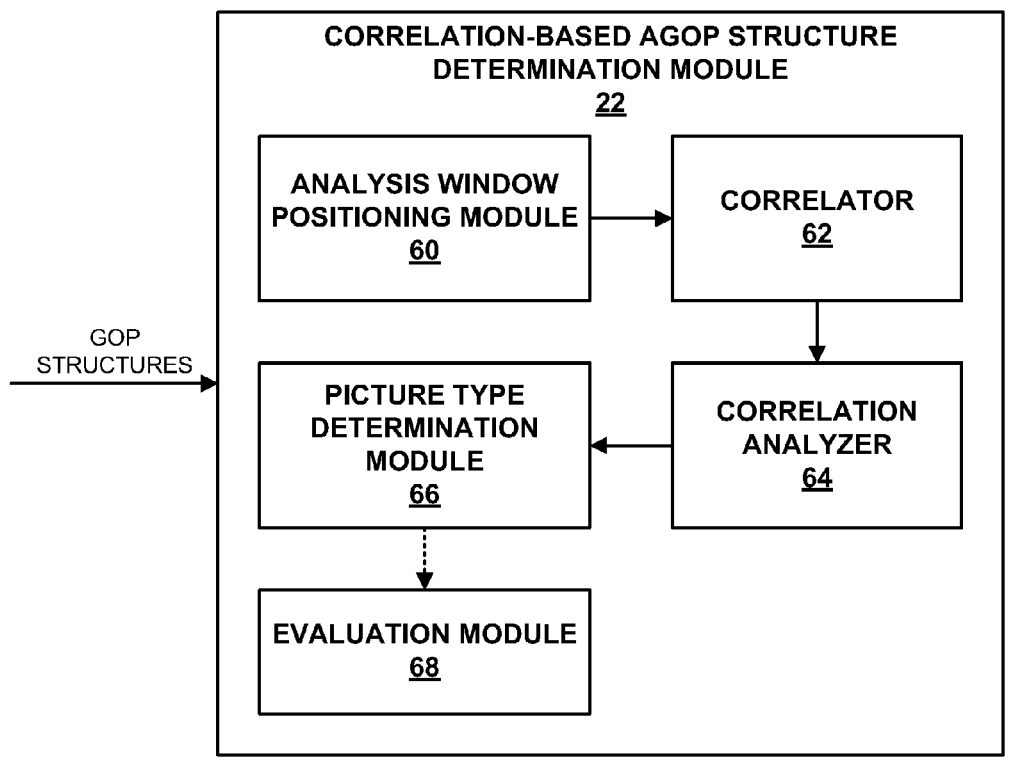
FIG. 7 is a block diagram illustrating the correlation-based AGOP structure determination module from FIGS. 1-4 in greater detail.

FIG. 7 is a block diagram illustrating correlation-based AGOP structure determination module 22 in greater detail. As described above, correlation-based AGOP structure determination module 22 may be used as an offline benchmark external to a real-time coding device (FIGS. 1 and 3) or may be implemented in a real-time coding device (FIGS. 2 and 4). As illustrated in FIG. 7, correlation-based AGOP structure determination module 22 includes an analysis window positioning module 60, a correlator 62, a correlation analyzer 64, a picture type determination module 66, and an evaluation module 68.

In general, correlation-based AGOP structure determination module 22 receives frames included in GOP structures and determines picture types for each of the frames based on cross-correlations between image information within pairs of frames. Analysis window positioning module 60 positions an analysis window of a predetermined frame count width within a GOP structure centered at a candidate frame. For example, the analysis window may have a temporal width of five frames such that when centered at the candidate frame the analysis window also includes two previous neighboring frames and two subsequent neighboring frames of the candidate frame.

Correlator 62 calculates first order cross-correlations between images within pairs of frames included in the analysis window. In this way, the analysis window places a limit on the number of first order cross-correlations that correlator 62 calculates to determine a picture type for the candidate frame. In one aspect, correlator 62 calculates the first order cross-correlations between full frame images. The first order image cross-correlations identify amounts of global, i.e., overall, similarity and global movement between the pairs of frames, but not the movement that occurred within the frames at the smaller scale of subimages. Correlator 62 then calculates second order cross-correlations between pairs of the first order image cross-correlations.

In another aspect, correlator 62 calculates first order cross-correlations between sets of subimages within pairs of frames. The images within each of the frames may be divided into multiple subimages, such as macroblocks. For example, a subimage may comprise a 16×16, 16×8, 8×16, 8×8 or smaller pixel block. Each of the subimages of a first frame are then padded to a common image size and cross-correlated with a padded subimage from a second frame. Correlator 62 generates the first order cross-correlations by averaging the peak subimage cross-correlation values over all or a portion of the subimages for each of the pairs of frames. The first order subimage cross-correlations identify subimage similarity and amounts of movement between the pairs of frames and identify where the movement occurred within the frames. Correlator 62 then calculates second order cross-correlations between pairs of the first order subimage cross-correlations.

Correlation analyzer 64 receives the first and second order cross-correlations from correlator 62. Correlation analyzer 64 detects video transitional effects between the frames within the analysis window based on the first order cross-correlations. The video transitional effects refer to visual video effects that are used to transition from a current scene of a video sequence to another scene of the same video sequence or to another scene of another video sequence. For example, correlation analyzer 64 may detect compact support video effects including cut scene changes, shot boundaries, flash frames, and partial scene changes. A cut scene change may occur when a video sequence changes from one video scene to a different video scene due to a change in content on the same content channel or due to channel or camera switching. A partial scene change may occur when a portion of a frame composition changes from one scene to a different scene and a remaining portion of the frame composition is static, e.g., borders, graphic and text overlays. A flash frame may occur when a video sequence momentarily changes luminance values due to flash photography at the video recorded event.

Correlation analyzer 64 may also detect extended support video effects including cross-fades and dissolves, that include fade-ins and fade-outs as special cases as well as zoom-ins and zoom-outs. A cross-fade may occur when a video sequence gradually changes from one video scene to a different video scene due to a change in content, e.g., a weather map changing from one region of the country to another. In addition, correlation analyzer 64 may detect global motion video effects including camera pans and camera scrolls. A camera pan may occur when a video sequence gradually changes from one video scene to a different video scene due to horizontal movement of the video camera. A camera scroll may occur when a video sequence incrementally changes from one video scene to a different video scene due to vertical movement of the video camera.

The different video transitional effects exhibit different levels of image data and detail repetition between the candidate frame and the neighboring frames included in the analysis window, and therefore signify different picture types for the candidate frame. For example, if a cut scene change occurs in the candidate frame, the candidate frame should be encoded as an I picture because the video scene completely changes. In the case of a partial scene change occurring in the candidate frame, the portion of the candidate frame including the static border, graphic or text overlay may be encoded as a P slice and the portion of the candidate frame including the active video scene which changed may be encoded as an I slice. If a flash frame, cross-fade, zoom-in or zoom-out, or camera pan or scroll occurs in the candidate frame, the candidate frame may be encoded as either a P picture or a B picture because the video scene changes slightly or gradually in reliance on previous frames and possibly subsequent frames.

Correlation analyzer 64 also performs a comparative analysis between the first order cross-correlations and the second order cross-correlations and determines temporal similarities between neighboring frames within the analysis window based on the comparative analysis. The temporal similarities refer to the level of image detail repetition between the candidate frame and the neighboring frames included in the analysis window. The amount of temporal similarities signifies the picture type for the candidate frame. For example, if the candidate frame is not similar to any previous neighboring frame but it is similar to a subsequent neighboring frame, the candidate frame should be encoded as an I picture. If the candidate frame is similar to a previous neighboring frame but not to a subsequent neighboring frame, the candidate frame should be encoded as a P picture. If the candidate frame is similar to both a previous neighboring frame and a subsequent neighboring frame, it should be encoded as either a P picture or a B picture. In this case, the first order cross-correlations between the neighboring frames included in the analysis window and the second order cross-correlations may help determine whether the candidate frame should be encoded as a P picture or a B picture. For example, if the previous neighboring frame is similar to the subsequent neighboring frame, the candidate frame should be encoded as a P picture.

Picture type determination module 66 receives video transitional effect information and temporal similarity information from correlation analyzer 64. Picture type determination module 66 determines a picture type for the candidate frame based on the video transitional effects detected within the analysis window and the temporal similarities between the frames included in the analysis window. In an implementation in which correlator 62 calculates image cross-correlations, picture type determination module 66 may determine a picture type for the candidate frame in its entirety. In an implementation in which correlator 62 calculates subimage cross-correlations, the candidate frame may be divided into multiple slices such that picture type determination module 66 may determine a picture type for each of the individual slices of the candidate frame.

Evaluation module 68 measures the performance of picture type determination module 66 based on its dependency on frame content, rate-distortion improvement characteristics, and encoding bandwidth regime characteristics. Evaluation module 68 may utilize a coding gain model or a PSNR improvement model dependent upon the number and temporal positions of determined P, B and I pictures in the GOP structure. For use in a PSNR improvement model, the determined picture types can be summarized in the form of an effective count of reference pictures available for temporal prediction. The output of evaluation module 68 may be used to further improve the accuracy of picture type determinations by correlation-based AGOP structure determination module 22. The output of evaluation module 68 may be in the form of numeric values or tables. Evaluation module 68 may be especially useful in an implementation in which correlation-based AGOP structure determination module 22 is implemented within a real-time coding device (FIGS. 2 and 4).

In an implementation in which the video data is encoded in a base layer and an enhancement layer, i.e., for scalable video coding (SVC), correlation-based AGOP structure determination module 22 may include a layering module (not shown in FIG. 7) to enable changes to frame type determinations in the base layer based on the enhancement layer. For example, certain frame types included in the base layer may improve bandwidth balancing between the base layer and the enhancement layer. Therefore, the layering module may change a frame type within the base layer encoding based on a frame type within the enhancement layer in order to improve the bandwidth balancing.

Figure 8A:
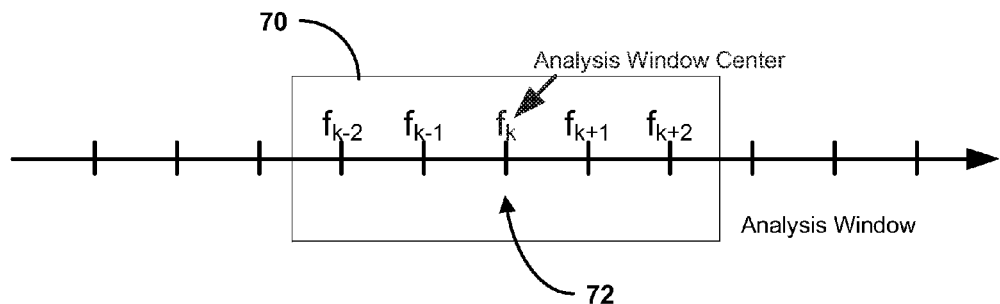
FIGS. 8A-8C are graphs illustrating first and second order cross-correlations between frames included in a video sequence.
Figure 8B:
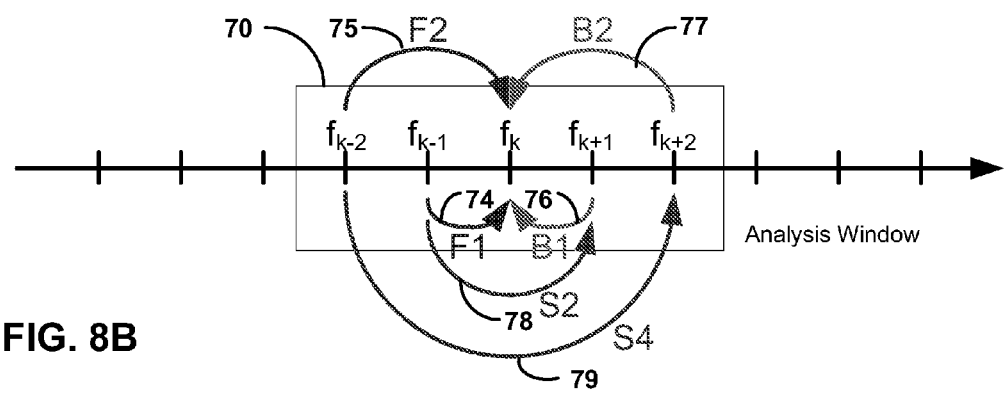
Figure 8C:
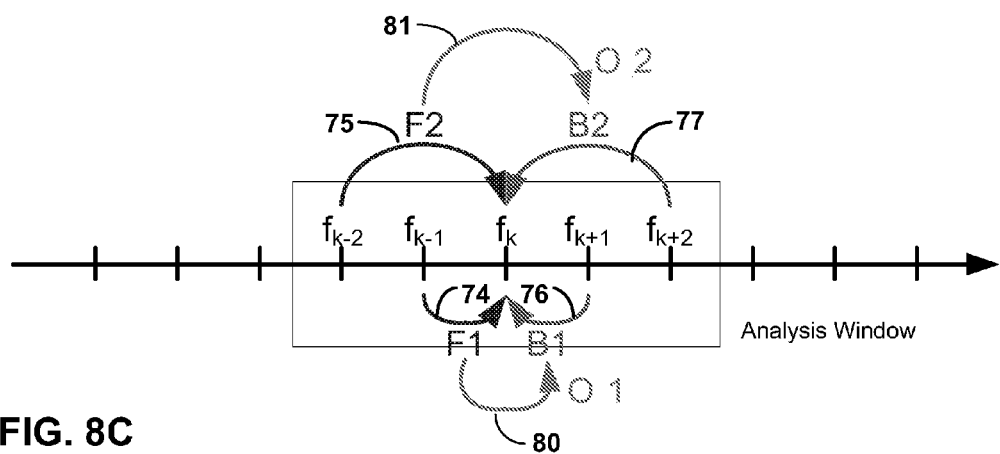

FIGS. 8A-8C are graphs illustrating first and second order cross-correlations between frames included in a video sequence. In one aspect, correlator 62 from FIG. 7 calculates the first order cross-correlations described herein between images within pairs of frames included in analysis window 70. In another aspect, correlator 62 calculates the first order cross-correlations described herein between sets of subimages, e.g., macroblocks, within pairs of frames included in the analysis window 70 and averages the cross-correlations over all or a portion of the subimages for each of the pairs of frames.

FIG. 8A illustrates positioning of an analysis window 70 within a GOP structure by analysis window positioning module 60 from FIG. 7. As shown in FIG. 8A, analysis window 70 is positioned within the GOP structure centered at a candidate frame ($f_k$) 72 and includes a predetermined number of neighboring frames. For example, analysis window 70 has a predetermined temporal width of five frames such that when centered at candidate frame ($f_k$) 72 the analysis window also includes two previous neighboring frames ($f_{k-1}$ and $f_{k-2}$) and two subsequent neighboring frames ($f_{k+1}$ and $f_{k+2}$) of candidate frame ($f_k$) 72. In this way, correlator 62 calculates first order cross-correlations between the frames included in analysis window 70 to determine the picture type for candidate frame 72. In other words, the use of analysis window 70 places a limit on the number of first order cross-correlations correlator 62 calculates to determine a picture type for each frame included in the GOP structure.

FIG. 8B illustrates the first order cross-correlation calculations performed by correlator 62 between the frames included in analysis window 70. Correlator 62 calculates a first forward cross-correlation (F1) 74 between a first previous neighboring frame ($f_{k-1}$) and candidate frame ($f_k$) 72. Correlator 62 then calculates a second forward cross-correlation (F2) 75 between a second previous neighboring frame ($f_{k-2}$) and candidate frame ($f_k$) 72. Correlator 62 also calculates a first backward cross-correlation (B1) 76 between a first subsequent neighboring frame ($f_{k+1}$) and candidate frame ($f_k$) 72. Correlator 62 then calculates a second backward cross-correlation (B2) 77 between a second subsequent neighboring frame ($f_{k+2}$) and candidate frame ($f_k$) 72. Correlator 62 next calculates a first symmetric cross-correlation calculation (S2) 78 between the first previous neighboring frame ($f_{k-1}$) and the first subsequent neighboring frame ($f_{k+1}$). Correlator 62 then calculates a second symmetric cross-correlation calculation (S4) 79 between the second previous neighboring frame ($f_{k-2}$) and the second subsequent neighboring frame ($f_{k+2}$).

FIG. 8C illustrates the second order cross-correlation calculations performed by correlator 62 between the first order cross-correlations within analysis window 70. Correlator 62 calculates second order first neighbor cross-correlation (O1) 80 between first order first forward cross-correlation (F1) 74 and first order first backward cross-correlation (B1) 76. Correlator 62 then calculates second order second neighbor cross-correlation (O2) 81 between first order second forward cross-correlation (F2) 75 and first order second backward cross-correlation (B2) 77.

In some aspects, correlator 62 may be used within correlation-based AGOP determination module 22 as an offline benchmark external to a real-time coding device, as shown in FIGS. 1 and 3. In that case, correlator 62 calculates the first and second order cross-correlations described herein in non-real-time. In other aspects, correlator 62 may be used within correlation-based AGOP determination module 22 implemented in a real-time coding device, as shown in FIGS. 2 and 4. In some cases, complexity reductions may limit a number of cross-correlations that correlator 62 may calculate when determining a picture type for candidate frame 72. For example, when analysis window 70 has a temporal width equal to five frames, correlator 62 may only calculate three first order cross-correlations and two second order cross-correlations. For example, correlator 62 may calculate first forward cross-correlation (F1) 74, first symmetric cross-correlation (S2) 78, second symmetric cross-correlation (S4) 79, second order first neighbor cross-correlation (O1) 80, and second order second neighbor cross-correlation (O2) 81.

Figure 9:
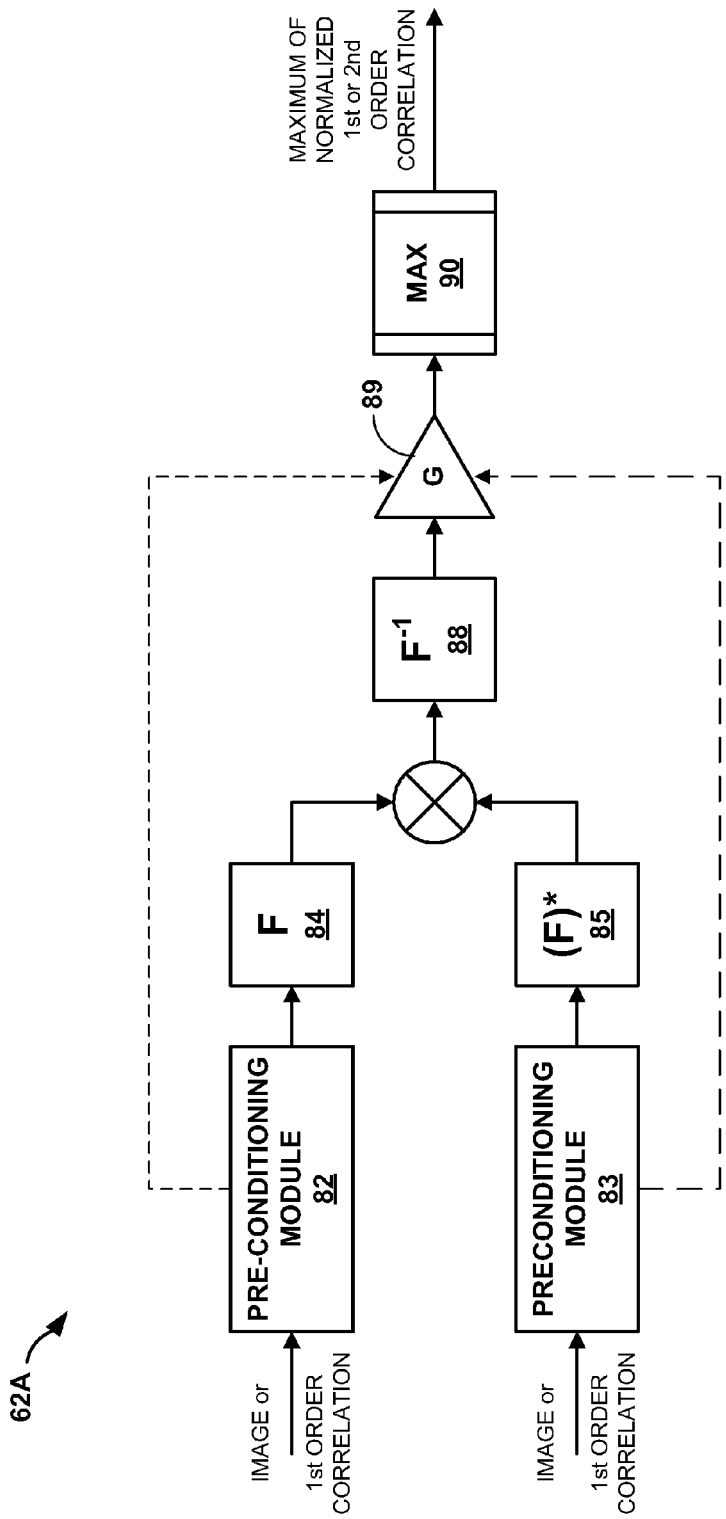
FIG. 9 is a block diagram illustrating an exemplary implementation of a correlator included in the correlation-based AGOP structure determination module from FIG. 7.

FIG. 9 is a block diagram illustrating an exemplary implementation of correlator 62 included in correlation-based AGOP structure determination module 22. As shown in FIG. 9, correlator 62A comprises a two-dimensional Fast Fourier Transform (2D FFT) based calculation to perform image cross-correlations. Correlator 62A may calculate both first order cross-correlations between images within pairs of frames included in a video sequence and second order cross-correlations between pairs of the first order image cross-correlations.

When correlator 62A is calculating first order image cross-correlations, a preconditioning module 82 receives an image within a first frame and feeds the preconditioned image to a Fourier Transform (F) 84. At the same time, a preconditioning module 83 receives an image within a second frame and feeds the preconditioned image to a complex conjugated (F*) Fourier Transform 85. The transform of the first frame image and the complex conjugate transform of the second frame image are multiplied and fed to an inverse Fourier transform ($F^{-1}$) 88. A normalizer 89 then normalizes the inverse transform output and a max filter 90 determines a maximum value of the normalized first order cross-correlation between the images within the first frame and the second frame. The maximum value of the normalized first order image cross-correlation is then retained as the characteristic value for use by correlation analyzer 64.

When correlator 62A is calculating second order cross-correlations, preconditioning module 82 receives a first order image cross-correlation between a first pair of frames and feeds the preconditioned first order image cross-correlation to Fourier Transform (F) 84. At the same time, preconditioning module 83 receives a first order image cross-correlation between a second pair of frames and feeds the preconditioned first-order image cross-correlation to complex conjugated (F*) Fourier Transform 85. The transform of the image cross-correlation between the first pair of frames and the complex conjugated transform of the image cross-correlation between the second pair of frames are multiplied and fed to inverse Fourier transform ($F^{-1}$) 88. Normalizer 89 then normalizes the inverse transform output and max filter 90 determines a maximum value of the normalized second order cross-correlation between the first order image cross-correlations between the first pair of frames and the second pair of frames. The maximum value of the normalized second order image cross-correlation is then retained as the characteristic value for use by correlation analyzer 64.

Figure 10:
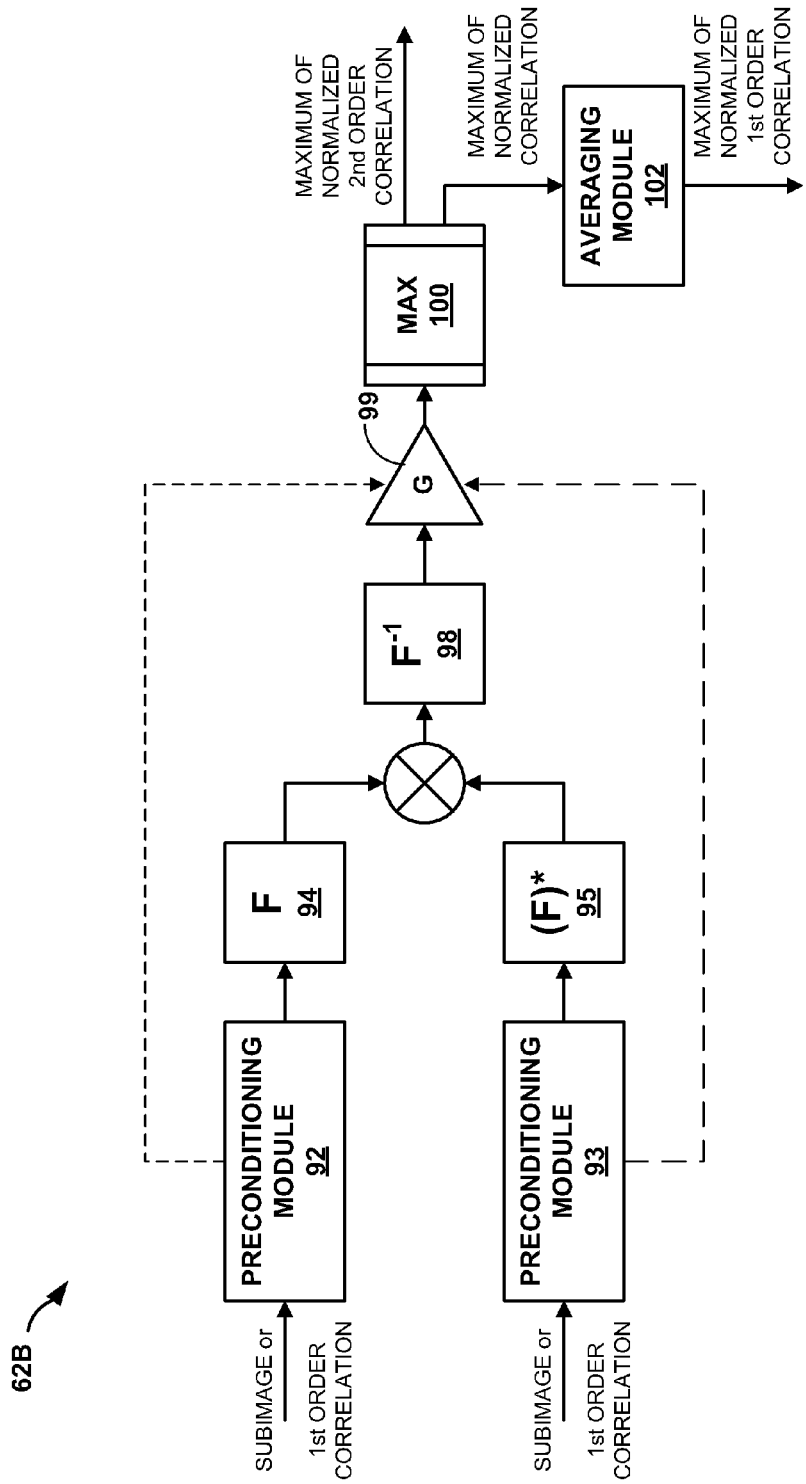
FIG. 10 is a block diagram illustrating another exemplary implementation of a correlator included in the correlation-based AGOP structure determination module from FIG. 7.

FIG. 10 is a block diagram illustrating another exemplary implementation of correlator 62 included in correlation-based AGOP structure determination module 22. As shown in FIG. 10, correlator 62B comprises a two-dimensional (2D) FFT based calculation to perform subimage cross-correlations. Correlator 62B may calculate both first order cross-correlations between subimages within pairs of frames included in a video sequence and second order cross-correlations between pairs of the first order subimage cross-correlations.

When correlator 62B is calculating first order subimage cross-correlations, a preconditioning module 92 receives a subimage, e.g., a set of macroblocks, within a first frame and feeds the preconditioned subimage to a Fourier Transform (F) 94. Preconditioning module 92 pads the subimage within the first frame to a common image size. At the same time, a preconditioning module 93 receives a subimage e.g., a set of macroblocks, within a second frame and feeds the preconditioned subimage to a complex conjugated Fourier Transform (F*) 95. Preconditioning module 93 pads the subimage within the second frame to the common image size. The transform of the first frame padded subimage and the complex conjugated transform of the second frame padded subimage are multiplied and fed to an inverse Fourier Transform ($F^{-1}$) 98. A normalizer 99 then normalizes the inverse transform output and a max filter 100 determines a maximum value of the normalized first order cross-correlation between the subimage within the first frame and the subimage within the second frame. An averaging module 102 then averages the maximum values of the normalized cross-correlations over all or a portion of the subimages in the set of subimages within the first frame. The averaged maximum value of the normalized first order cross-correlation is then retained as the characteristic value for use by correlation analyzer 64.

When correlator 62B is calculating second order cross-correlation calculations, preconditioning module 92 receives a first order cross-correlation subsegment between a first pair of frames and feeds the preconditioned first order cross-correlation subsegment to Fourier Transform (F) 94. At the same time, preconditioning module 93 receives a first order cross-correlation subsegment between a second pair of frames and feeds the preconditioned first-order cross-correlation subsegment to complex conjugated (F*) Fourier Transform 95. The transform of the first order cross-correlation subsegment between the first pair of frames and the complex conjugated transform of the first order cross-correlation subsegment between the second pair of frames are multiplied and fed to inverse Fourier transform ($F^{-1}$) 98. Normalizer 99 then normalizes the inverse transform output and max filter 100 determines a maximum value of the normalized second order cross-correlation between the first order cross-correlation subsegments between the first pair of frames and the second pair of frames. The maximum value of the normalized second order cross-correlation is then retained as the characteristic value for use by correlation analyzer 64.

Figure 11:
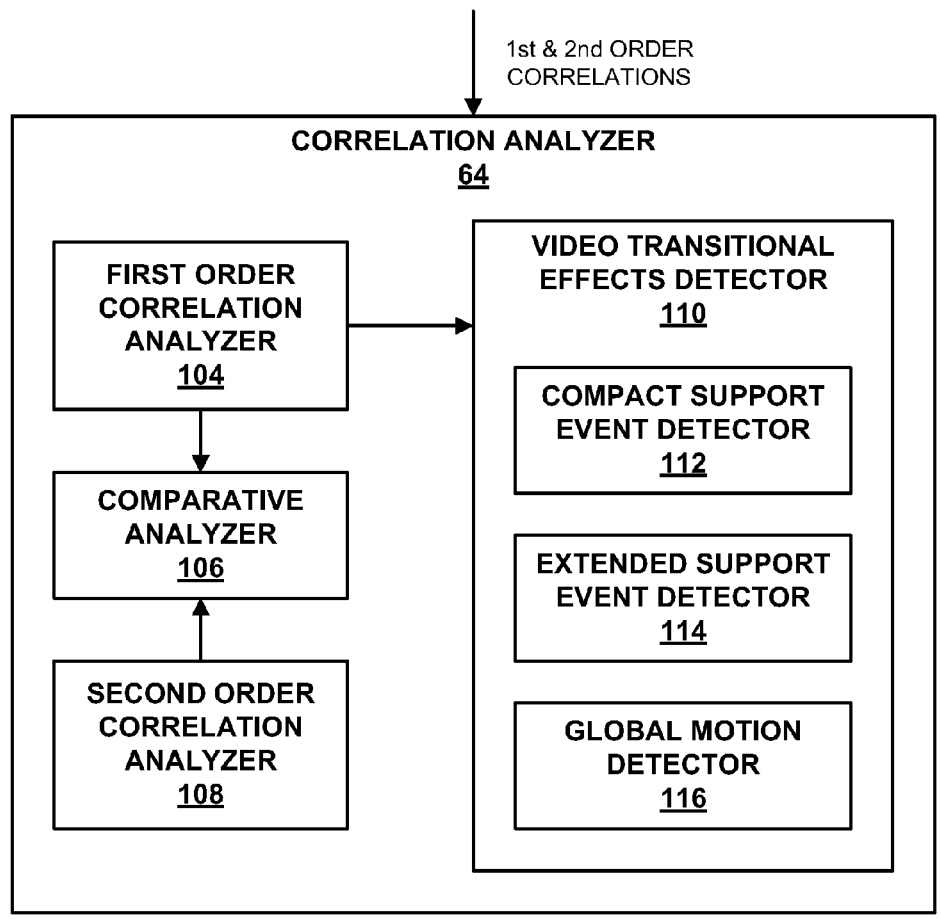
FIG. 11 is a block diagram illustrating an exemplary implementation of a correlation analyzer included in the correlation-based AGOP structure determination module from FIG. 7.

FIG. 11 is a block diagram illustrating an exemplary implementation of correlation analyzer 64 included in correlation-based AGOP structure determination module 22. As illustrated in FIG. 11, correlation analyzer 64 comprises a first order correlation analyzer 104, a comparative analyzer 106, a second order correlation analyzer 108, and a video transitional effect detector 110. Video transitional effect detector 110 includes a compact support event detector 112, an extended support event detector 114, and a global motion detector 116.

Correlation analyzer 64 receives the first and second order cross-correlations from correlator 62. First order correlation analyzer 104 compiles the first order cross-correlations and feeds the first order cross-correlations to video transitional effect detector 110 and comparative analyzer 106. Second order correlation analyzer 108 compiles the second order cross-correlations and applies the second order cross correlations to comparative analyzer 106.

Video transitional effect detector 110 detects video transitional effects between the frames of the currently processed GOP structure based on the first order cross-correlations. As described in reference to FIGS. 12-14, video transitional effect detector 110 detects the video transitional effects based on the identification of video special effects via compact support event detector 112, extended support event detector 114, and global motion detector 116. More specifically, compact support event detector 112 identifies cut scene change fingerprints, flash frame fingerprints, and partial scene change fingerprints from the first order cross-correlations. Extended support event detector 114 identifies cross-fade, including fade-in and fade-out, fingerprints and zoom-in and zoom-out fingerprints from the first order cross-correlations. Global motion detector 116 identifies camera pan fingerprints and camera scroll fingerprints from the first order cross-correlations. A fingerprint is defined herein to mean a particular response from a matched filter that is uniquely matched to a certain video transitional effect such that detection of that particular response is equivalent to detection of its associated video transitional effect.

Video transitional effect detector 110 then outputs the detected video transitional effects to picture type determination module 66 (FIG. 7). If, for example, a cut scene change occurs in candidate frame 72, candidate frame 72 should be encoded as an I picture because the video scene completely changes. In the case of a partial scene change occurring in candidate frame 72, the portion of candidate frame 72 including the static border, graphic or text overlay may be encoded as a P slice and the portion of candidate frame 72 including the active video scene which changed may be encoded as an I slice. If a flash frame, cross-fade, zoom-in or zoom-out, or camera pan or scroll occurs in the candidate frame, candidate frame 72 may be encoded as a P picture or a B picture because the video scene changes slightly or gradually in reliance on previous frames and possibly subsequent frames.

Comparative analyzer 106 performs a comparative analysis between the first order cross-correlations and the second order cross-correlations. Comparative analyzer 106 then determines temporal similarities between neighboring frames within analysis window 70 based on the comparative analysis. When performing the comparative analysis, comparative analyzer 106 compares the levels of correlation between the frames to determine how similar candidate frame 72 is to its neighboring frames both previous and subsequent, and how similar the neighboring frames are to each other. Comparative analyzer 106 then outputs the temporal similarities to picture type determination module 66 (FIG. 7). If, for example, candidate frame 72 correlates well with the subsequent neighboring frames but not with the previous neighboring frames, i.e., first forward cross-correlation 74 is low and first backward cross-correlation 76 is high, candidate frame 72 should be encoded as an I picture that has no relation to previous frames and that serves as a reference to subsequent frames. As another example, if candidate frame 72 correlates well to both the subsequent neighboring frames and the previous neighboring frames, candidate frame 72 should be encoded as either a P picture or a B picture. However, if the subsequent neighboring frames correlate well with the previous neighboring frames, i.e., first symmetric cross-correlation 78 is high, then candidate frame 72 may be encoded as a P picture.

Figure 12:
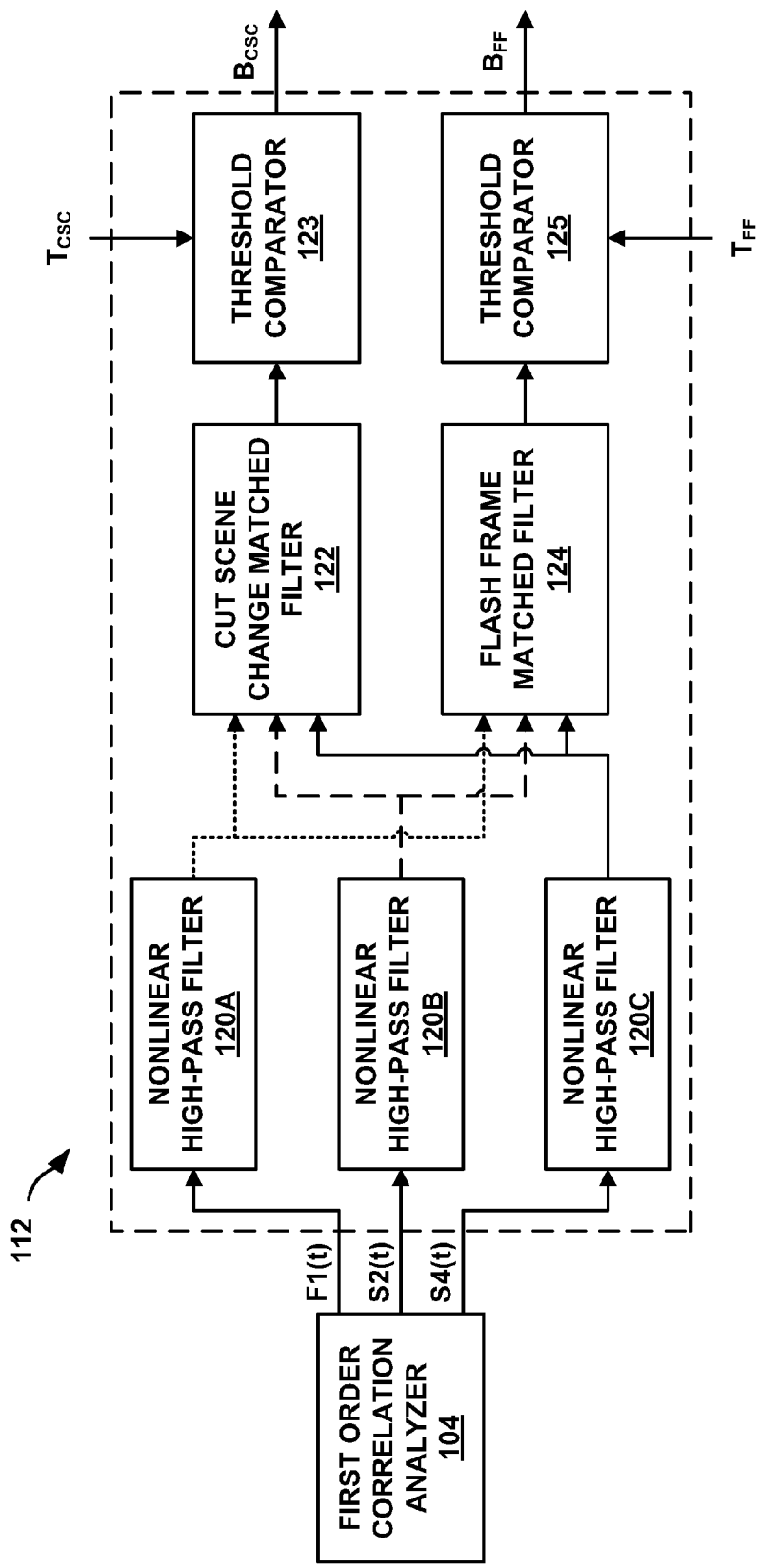
FIG. 12 is a block diagram illustrating a compact support event detector as a portion of a video transition detector included in the correlation analyzer from FIG. 11.

FIG. 12 is a block diagram illustrating compact support event detector 112 as a portion of video transitional effect detector 110 included in correlation analyzer 64 from FIG. 11. Compact support event detector 112 may utilize matched filter banks to detect fingerprints associated with compact support video effects within the output of first order cross-correlation analyzer 104. Compact support video effects include cut scene changes, partial scene changes, and flash frames. For example, a cut scene change may occur when a video sequence content instantaneously changes from one video scene to a different video scene due to a change in content on the same channel or due to channel switching. A partial scene change may occur when a portion of the frame content in a video sequence changes from one video scene to a different video scene and a remaining portion of the frame content in the video sequence is static, e.g., borders, graphic or text overlays. A flash frame may occur when a video sequence content momentarily changes luminance values due to flash photography at the video recorded event.

In the example illustrated in FIG. 12, compact support event detector 112 utilizes the outputs of the first order first forward cross-correlation (F1) 74, the first order first symmetric cross-correlation (S2) 78, and the first order second symmetric cross-correlation (S4) 79 from FIG. 6. Compact support event detector 112 passes each of the first order cross-correlation outputs through a dedicated one of nonlinear high-pass filters 120A-120C. The output of each of nonlinear high-pass filters 120A-120C is input to both a cut scene change matched filter 122 and a flash frame matched filter 124.

Cut scene change matched filter 122 isolates time series features included in the output of the first order cross-correlations that are similar to an expected fingerprint of a cut scene change. For example, a cut scene change fingerprint comprises a single dip of low correlation between frames due to the complete change of video scene, as shown by feature 180 in FIG. 17. Compact support event detector 112 feeds the output of cut scene change matched filter 122 to threshold comparator 123 to accurately identify which of the features comprise cut scene change fingerprints. Threshold comparator 123 compares the features isolated by cut scene change matched filter 122 to a threshold value ($T_{CSC}$) set to a predetermined value, e.g., 0.29. Compact support event detector 112 detects a cut scene change at those feature locations with matched filter responses greater than the threshold value. Threshold comparator 123 then sets its Boolean output ($B_{CSC}$) equal to 1 if a cut scene change is detected, and sets it equal to 0 if no cut scene change is detected.

Compact support event detector 112 may also detect a partial scene change by using cut scene change matched filter 122 and threshold comparator 123. A partial scene change fingerprint comprises a single dip, substantially similar to a cut scene change fingerprint, but has higher correlation due to the static portions of the video scene, as shown by feature 184 in FIG. 18. The relatively small dip of the partial scene change fingerprint may not trigger a large enough response from cut scene change matched filter 122 to be detected by compact support event detector 112. The threshold value ($T_{CSC}$) input to threshold comparator 123 may be lowered to enable detection of partial scene changes, but this may cause additional accuracy problems by increasing the likelihood of incorrectly detecting compact support video effects, i.e., increased false-alarm rate. Instead, correlator 62 may perform static border detection to identify the presence of a static border, and calculate first order cross-correlations between subimages corresponding to the active portion of the video scene. In this way, complete changes of only the active video scene with a static border may present a fingerprint equivalent to a cut scene change fingerprint.

Flash frame matched filter 124 isolates time series features included in the output of the first order cross-correlations that are similar to an expected fingerprint of a flash frame. For example, a flash frame fingerprint comprises successive dips of lower correlation between frames due to the change in luminance values within a video scene, as shown by feature 182 in FIG. 17. Compact support event detector 112 feeds the output of flash frame matched filter 124 to threshold comparator 125 to accurately identify which of the features comprise flash frame fingerprints. Threshold comparator 125 compares the features isolated by flash frame matched filter 124 to a threshold value ($T_{FF}$) set to a predetermined value, e.g., 0.20. Compact support event detector 112 detects a flash frame at those feature locations with matched filter responses greater than the threshold value. Threshold comparator 125 then sets its Boolean output ($B_{FF}$) equal to 1 if a flash frame is detected, and sets it equal to 0 if no flash frame is detected.

Figure 13:
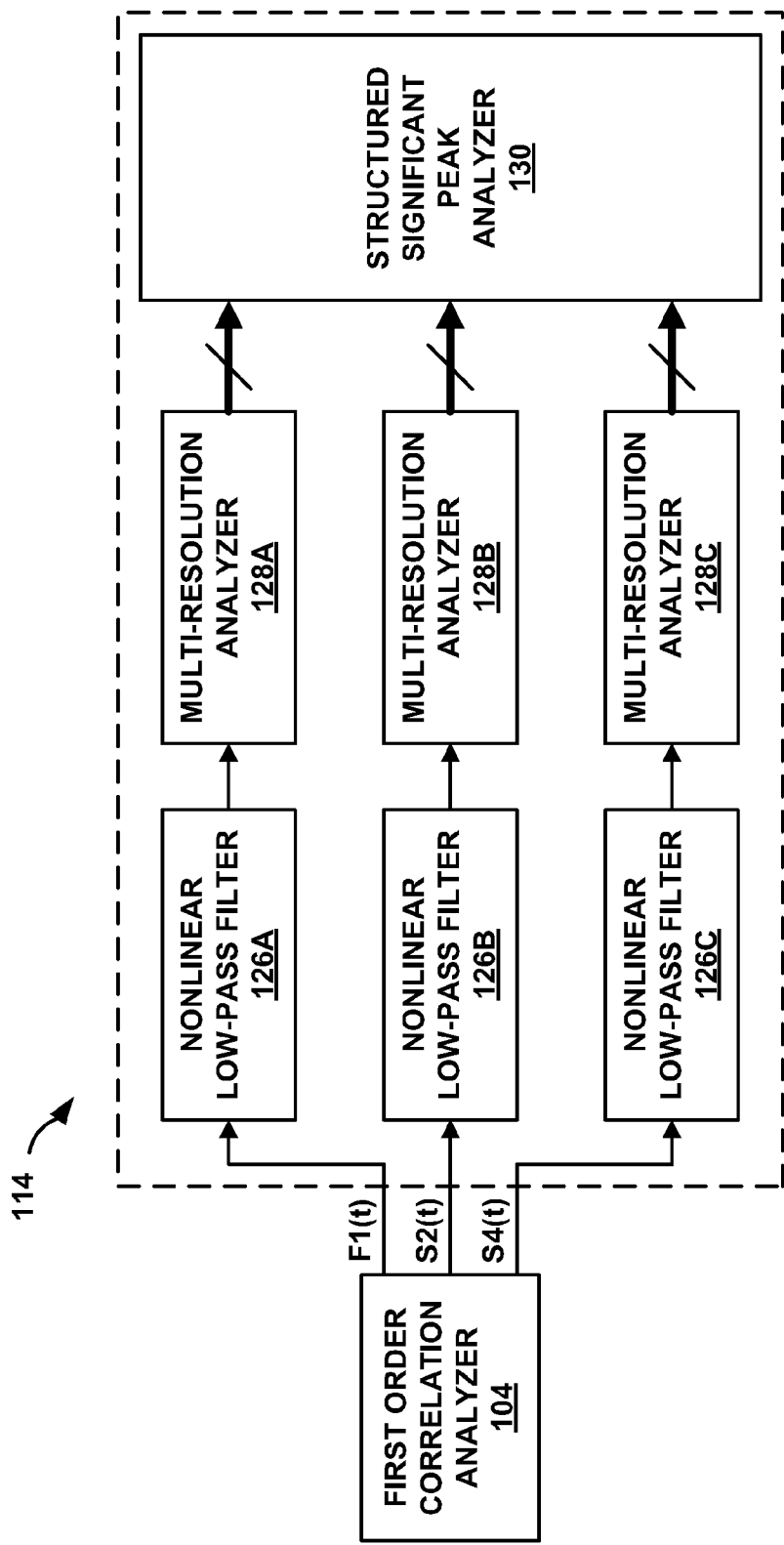
FIG. 13 is a block diagram illustrating an extended support event detector as a portion of the video transition detector included in the correlation analyzer from FIG. 11.

FIG. 13 is a block diagram illustrating extended support event detector 114 as a portion of video transitional effect detector 110 included in correlation analyzer 64 from FIG. 11. Extended support event detector 114 utilizes multi-resolution analysis to detect fingerprints associated with extended support video effects within the output of first order cross-correlation analyzer 104. Extended support video effects include cross-fades, fade-ins, fade-outs, and zooms. For example, a cross-fade may occur when a video sequence gradually changes from one video scene to a different video scene due to a change in content, e.g., a weather map changing from one region of the country to another.

In the example illustrated in FIG. 13, extended support event detector 114 utilizes the outputs of the first order first forward cross-correlation (F1) 74, the first order first symmetric cross-correlation (S2) 78, and the first order second symmetric cross-correlation (S4) 79 from FIG. 6. Extended support event detector 114 passes each of the first order cross-correlation outputs through a dedicated one of nonlinear low-pass filters 126A-126C. The output of each of nonlinear low-pass filters 126A-126C is input to a dedicated one of multi-resolution analyzers 128A-128C. Multi-resolution analyzers 128A-128C identify features included in the output of the first order cross-correlations that are similar to an expected fingerprint of a cross-fade or a zoom. For example, a cross-fade fingerprint comprises a notch of low correlation between frames due to the gradual change of video scene, as shown by feature 186 in FIG. 19. Multi-resolution analyzers 128A-128C enable detection of features with largely varying durations in a unified manner and the determination of their actual durations.

Extended support event detector 114 applies the output of multi-resolution analyzers 128A-128C to structured significant peak analyzer 130 to accurately identify which of the features comprise cross-fade or zoom fingerprints. Structured significant peak analyzer 130 combines the features identified by each of multi-resolution analyzers 128A-128C and determines whether the notches of low correlation in each of the outputs of the first order cross-correlations are temporally aligned in a specific order. Extended support event detector 114 may declare a cross-fade if the notches of the first order cross-correlations are temporally aligned with one another. In addition, the minimum values of the notches should desirably be ordered as the first order first forward cross-correlation (F1) 74 greater than the first order first symmetric cross-correlation (S2) 78 greater than the first order second symmetric cross-correlation (S4) 79.

Figure 14:
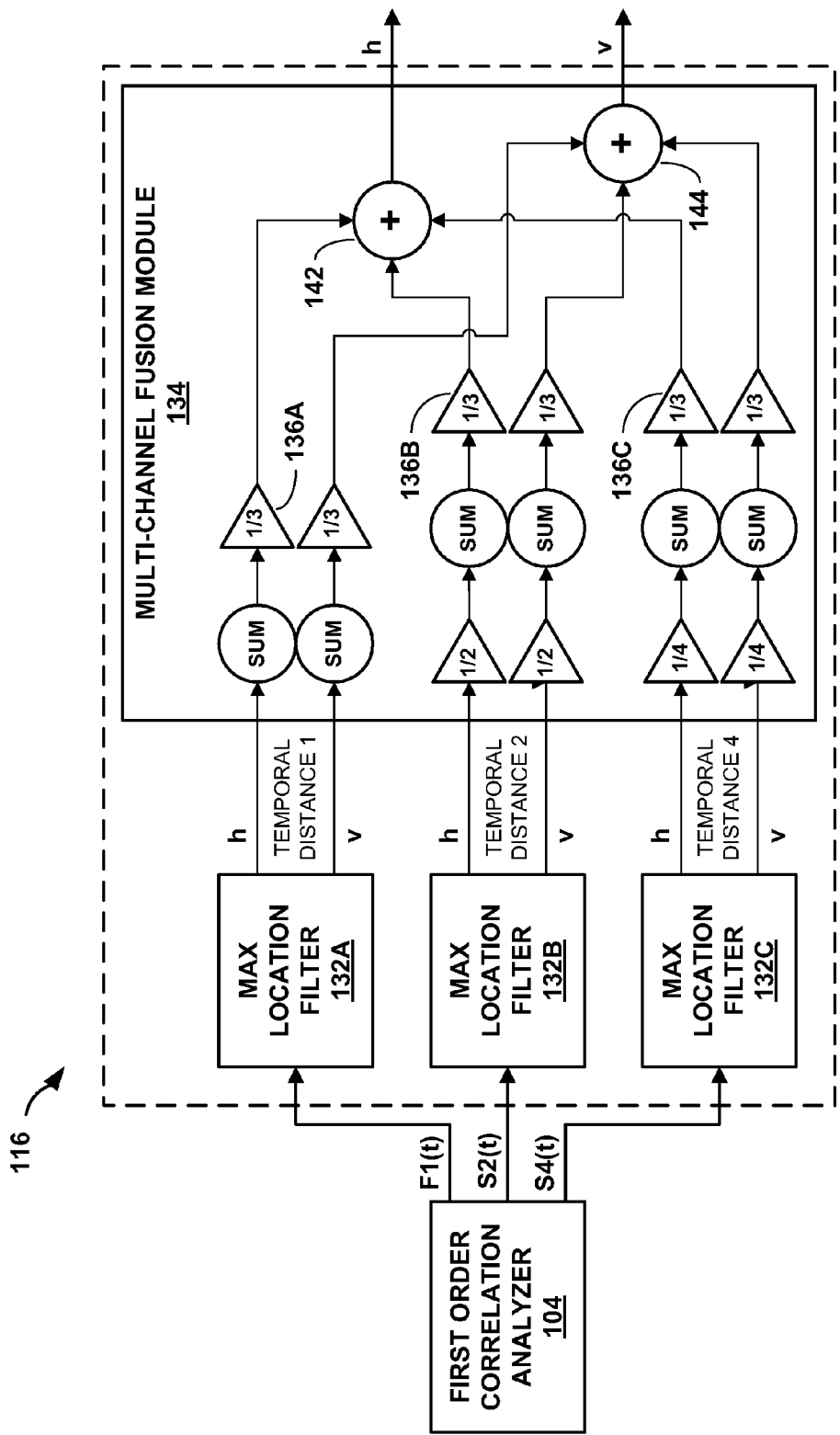
FIG. 14 is a block diagram illustrating a global motion detector as a portion of the video transition detector included in the correlation analyzer from FIG. 11.

FIG. 14 is a block diagram illustrating global motion detector 116 as a portion of video transitional effect detector 110 included in correlation analyzer 64 from FIG. 11. Global motion detector 116 utilizes global displacement estimates to detect fingerprints associated with global motion within the output of the first order cross-correlation analyzer 104. Global motion video effects include camera pans, camera scrolls, and other translational motion influencing an entire video scene. For example, a camera pan may occur when a video sequence gradually changes from one video scene to a different video scene due to horizontal movement of the video camera. A camera scroll may occur when a video sequence gradually changes from one video scene to a different video scene due to vertical movement of the video camera.

In the example illustrated in FIG. 14, global motion detector 116 utilizes the outputs of the first order first forward cross-correlation (F1) 74, the first order first symmetric cross-correlation (S2) 78, and the first order second symmetric cross-correlation (S4) 79 from FIG. 6. Global motion detector 116 passes each of the first order cross-correlation outputs through a dedicated one of max location filters 132A-132C. Max location filters 132A-132C identify features included in the output of the first order cross-correlations that are similar to an expected fingerprint of a camera pan and a camera scroll. For example, a camera pan fingerprint comprises a consistently present significant horizontal shift from the origin in the maximum cross-correlation value location due to the gradual change of video scene, as shown by feature 188 in FIG. 20A. A camera scroll fingerprint comprises a consistently present significant vertical shift from the origin in the maximum cross-correlation value location due to the incremental change of video scene, as shown by feature 200 in FIG. 20B. Max location filters 132A-132C each output a horizontal displacement estimate (h) and a vertical displacement estimate (v) at the temporal distance of the associated first order cross-correlation.

However, compression artifacts, such as ringing and blur, degrade the accuracy of displacement estimates from the first order cross-correlations. Therefore, global motion detector 116 utilizes a multi-channel fusion module 134 to smooth the horizontal and vertical displacement estimates against compression artifacts' degrading noise-like influence. Additionally, compact support video effects and extended support video effects may interrupt the global motion displacement estimation, which may lead to abnormal displacement estimate values. Multi-channel fusion module 134 may reduce or eliminate this effect by performing a nonlinear smoothing of the displacement estimates across the detected compact support and extended support video effects.

As illustrated in FIG. 14, multi-channel fusion module 134 includes ½ weights for the displacement estimates at temporal distance 2 and ¼ weights for the displacement estimates at temporal distance 4 to compensate for the different temporal distances associated with the different displacement estimates. Multi-channel fusion module 134 also includes uniform weights (e.g., ⅓) 136A-136C for each of the displacement estimates to equalize the emphasis of the displacement estimates at the different temporal distances. In other aspects, multi-channel fusion module 134 may use non-uniform weights to emphasize the displacement estimates at a select temporal distance. Finally, multi-channel fusion module 134 includes a horizontal adder 142 that generates a single smoothed horizontal displacement estimate value by adding the weighted horizontal displacement estimates from each of the temporal distances. Multi-channel fusion module 134 also includes a vertical adder 144 that generates a single smoothed vertical displacement estimate value by adding the vertical displacement estimates from each of the temporal distances.

Figure 15:
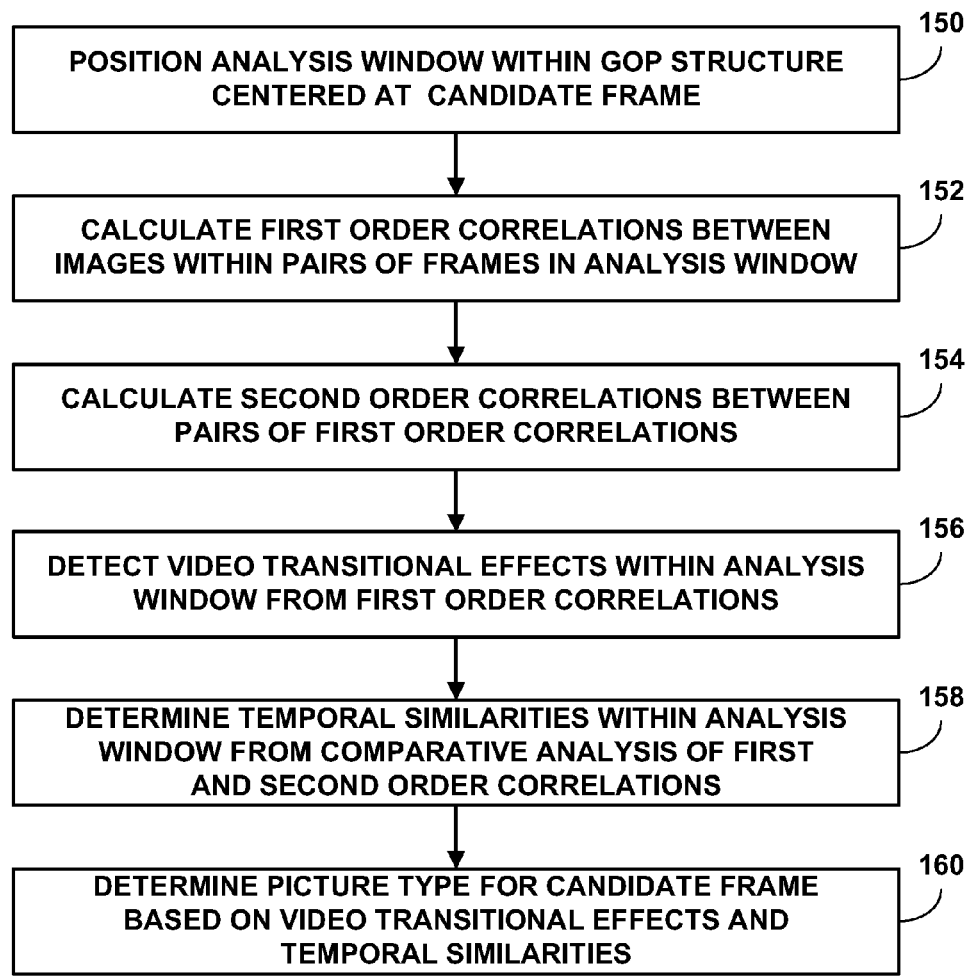
FIG. 15 is a flowchart illustrating an exemplary operation of a correlation-based AGOP structure determination module determining picture types for frames included in a video sequence based on image cross-correlations.

FIG. 15 is a flowchart illustrating an exemplary operation of correlation-based AGOP structure determination module 22 determining picture types for frames included in a video sequence based on image cross-correlations. The flowchart of FIG. 15 will be described in relation to correlation-based AGOP determination module 22 of FIG. 7, analysis window 70 of FIGS. 8A-8C, and correlation analyzer 64 of FIG. 11.

Analysis window positioning module 60 positions analysis window 70 within a GOP structure centered at candidate frame, $f_k$, 72 and including previous neighboring frames ($f_{k-1}$ and $f_{k-2}$) and subsequent neighboring frames ($f_{k+1}$ and $f_{k+2}$) (150). Correlator 62 calculates the first order cross-correlations between images within pairs of frames included in analysis window 70 (152). The first order cross-correlations are performed with respect to the pixel domain data of said images. In this aspect, correlator 62 calculates the first order cross-correlations between full frame images. As described above in reference to FIG. 8B, the first order cross-correlations may include first forward cross-correlation 74, second forward cross-correlation 75, first backward cross-correlation 76, second backward cross-correlation 77, first symmetric cross-correlation 78, and second symmetric cross-correlation 79. The first order image cross-correlations identify amounts of global, i.e., overall, similarity and global movement between the pairs of frames, but not the movement that occurred within the frames at the smaller scale of subimages. Correlator 62 then calculates second order cross-correlations between pairs of the first order image cross-correlations (154). As described above in reference to FIG. 8C, the second-order cross-correlations may include first neighbor cross-correlation 80 and second neighbor cross-correlation 81.

Correlation analyzer 64 receives the first and second order cross-correlations from correlator 62. First order correlation analyzer 104 compiles the first order cross-correlations and feeds the first order cross-correlations to video transitional effect detector 110 and comparative analyzer 106. Second order correlation analyzer 108 compiles the second order cross-correlations and feeds the second order cross correlations to comparative analyzer 106.

Video transitional effect detector 110 detects video transitional effects between the frames within the currently processed GOP structure based on the first order cross-correlations (156). As described in reference to FIGS. 10-12, video transitional effect detector 110 detects the video transitional effects based on the identification of video effects via compact support event detector 112, extended support event detector 114, and global motion detector 116. More specifically, compact support event detector 112 identifies cut scene change fingerprints, flash frame fingerprints, and partial scene change fingerprints from the first order cross-correlations. Extended support event detector 114 identifies cross-fade fingerprints including fade-in and fade-out fingerprints, and zoom-in and zoom-out fingerprints from the first order cross-correlations. Global motion detector 116 identifies camera pan fingerprints and camera scroll fingerprints.

Comparative analyzer 106 performs a comparative analysis between the first order cross-correlations and the second order cross-correlations. Comparative analyzer 106 then determines temporal similarities, their strength and nature, between neighboring frames within analysis window 70 based on the comparative analysis (158). When performing the comparative analysis, comparative analyzer 106 compares the levels of correlation between the frames to determine how similar candidate frame 72 is to its neighboring frames and how similar the neighboring frames are to each other.

Picture type determination module 66 receives video transitional effect information from video transitional effect detector 110 and temporal similarity information from comparative analyzer 106. Picture type determination module 66 then determines a picture type for candidate frame 72 based on the video transitional effects detected within analysis window 70 and the temporal similarities between the frames included in analysis window 70 (160).

Figure 16:
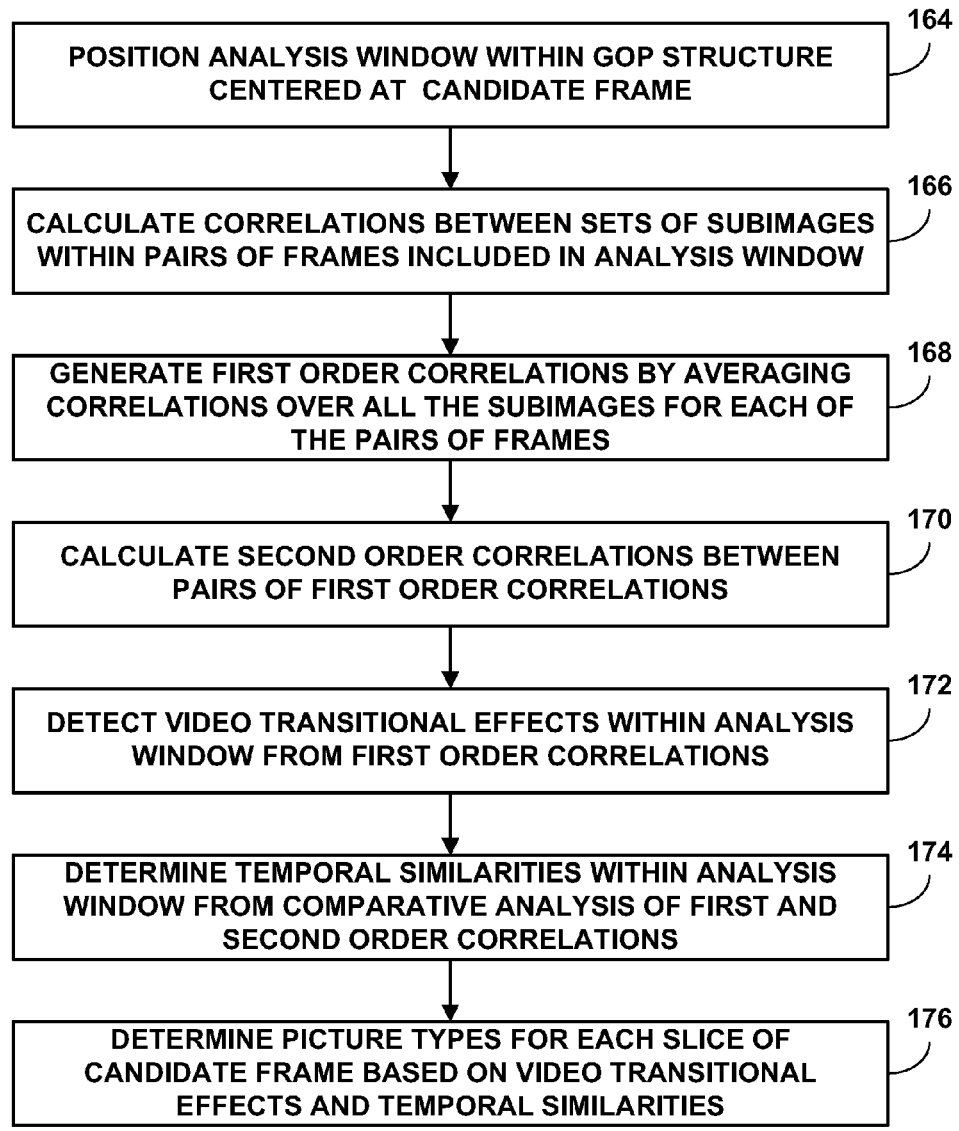
FIG. 16 is a flowchart illustrating an exemplary operation of a correlation-based AGOP structure determination module determining picture types for frames included in a video sequence based on subimage cross-correlations.

FIG. 16 is a flowchart illustrating an exemplary operation of correlation-based AGOP structure determination module 22 determining picture types for frames included in a video sequence based on subimage cross-correlations. The flowchart of FIG. 16 will be described in relation to correlation-based AGOP determination module 22 of FIG. 7, analysis window 70 of FIGS. 8A-8C, and correlation analyzer 64 of FIG. 11.

Analysis window positioning module 60 positions analysis window 70 within a GOP structure centered at candidate frame, $f_k$, 72 and including previous neighboring frames ($f_{k-1}$ and $f_{k-2}$) and subsequent neighboring frames ($f_{k+1}$ and $f_{k+2}$) (164). Correlator 62 calculates first order cross-correlations between sets of subimages within pairs of frames included in analysis window 70 (166). The subimage first order cross-correlations are performed with respect to the pixel domain data of said subimages. The images within each of the frames may be divided into multiple subimages, such as macroblocks. Each of the subimages of a first frame are then padded to a common image size and cross-correlated with a subimage of a second frame. For example, a subimage may comprise a 16×16 macroblock padded to a 64×64 image. Correlator 62 generates the first order cross-correlations by averaging the peak, i.e., maximum, subimage cross-correlation values over all or a portion of the subimages for each of the pairs of frames (168). The first order subimage cross-correlations identify subimage similarity and amounts of movement between the pairs of frames and identify where the movement occurred within the frames. Correlator 62 then calculates second order cross-correlations between pairs of the first order subimage cross-correlations (170).

Correlation analyzer 64 receives the first and second order cross-correlations from correlator 62. First order correlation analyzer 104 compiles the first order cross-correlations and feeds the first order cross-correlations to video transitional effect detector 110 and comparative analyzer 106. Second order correlation analyzer 108 compiles the second order cross-correlations and feeds the second order cross correlations to comparative analyzer 106. Video transitional effect detector 110 detects video transitional effects between the frames within the currently processed GOP structure based on the first order cross-correlations (172). Comparative analyzer 106 performs a comparative analysis between the first order cross-correlations and the second order cross-correlations. Comparative analyzer 106 then determines temporal similarities, their strength and nature, between neighboring frames within analysis window 70 based on the comparative analysis (174).

Picture type determination module 66 receives video transitional effect information from video transitional effect detector 110 and temporal similarity information from comparative analyzer 106. Candidate frame 72 may be divided into multiple slices such that picture type determination module 66 may determine a picture type for each of the individual slices of candidate frame 72 based on the video transitional effects detected within analysis window 70 and the temporal similarities between the frames included in analysis window 70 (176).

Figure 17:
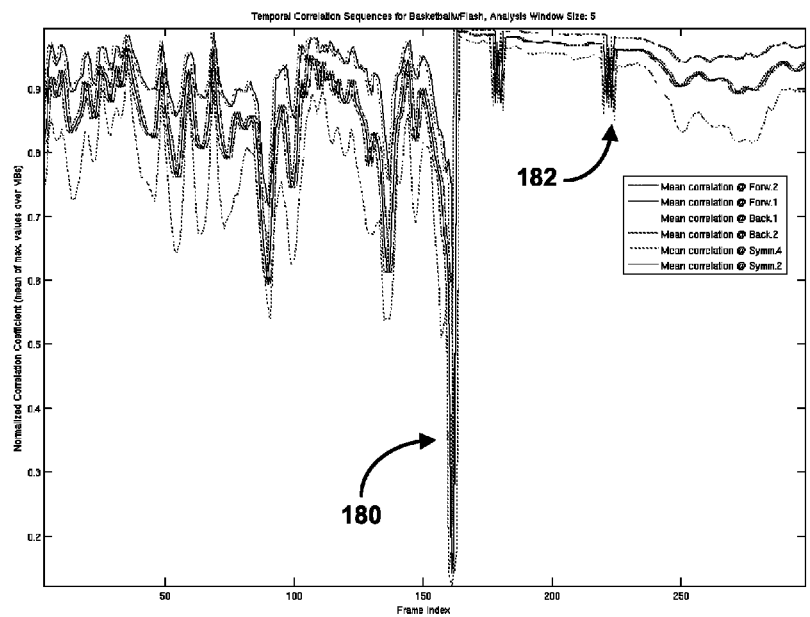
FIG. 17 is a plot illustrating output of the compact support event detector from FIG. 12 including a cut scene change fingerprint and a flash frame fingerprint.

FIG. 17 is a plot illustrating output of compact support event detector 112 from FIG. 12 including a cut scene change fingerprint 180 and a flash frame fingerprint 182. A cut scene change may occur when a video sequence content changes from one video scene to a different video scene due to a change in content on the same channel, e.g., due to a change in the selected camera feed or due to channel switching. Therefore, cut scene change fingerprint 180 comprises a single dip of low correlation between frames due to the complete change of video scene. A flash frame may occur when a video sequence momentarily changes luminance values due to flash photography at the video recorded event. Therefore, flash frame fingerprint 182 comprises successive dips of lower correlation between frames due to the change in luminance values within a video scene. The successive dips are generated by the appearance and disappearance of flash induced increased brightness in the video sequence. In the case of a flash frame, there are effectively two changes taking place in a very short time frame compared to the single change of a cut scene change.

Figure 18:
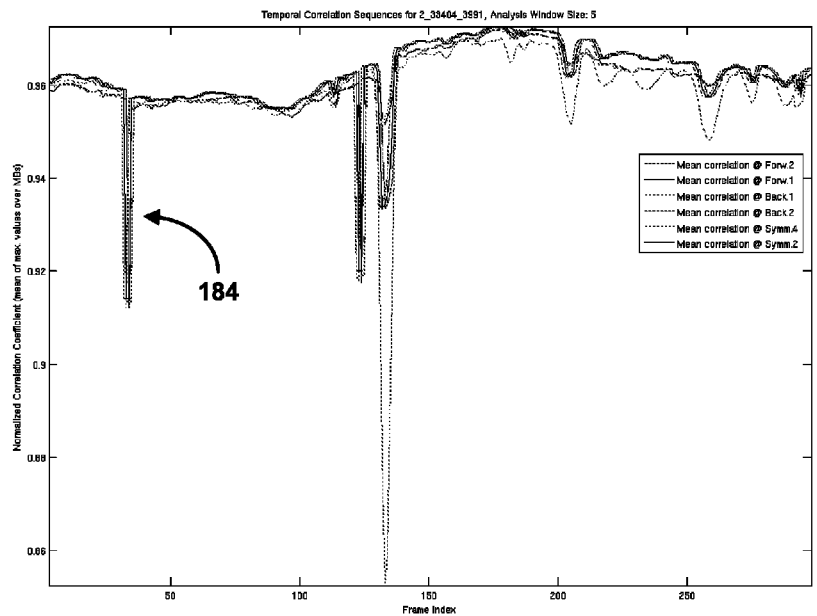
FIG. 18 is a plot illustrating output of the compact support event detector from FIG. 12 including a partial scene change fingerprint.

FIG. 18 is a plot illustrating output of compact support event detector 112 from FIG. 12 including a partial scene change fingerprint 184. A partial scene change may occur when a portion of a video sequence frame content changes from one video scene to a different video scene and a remaining portion of the video sequence frame content is static, e.g., borders and graphic and text overlays. Therefore, partial scene change fingerprint 184 comprises a single dip, substantially similar to cut scene change fingerprint 180, but having higher correlation due to the static portions of the video scene.

Figure 19:
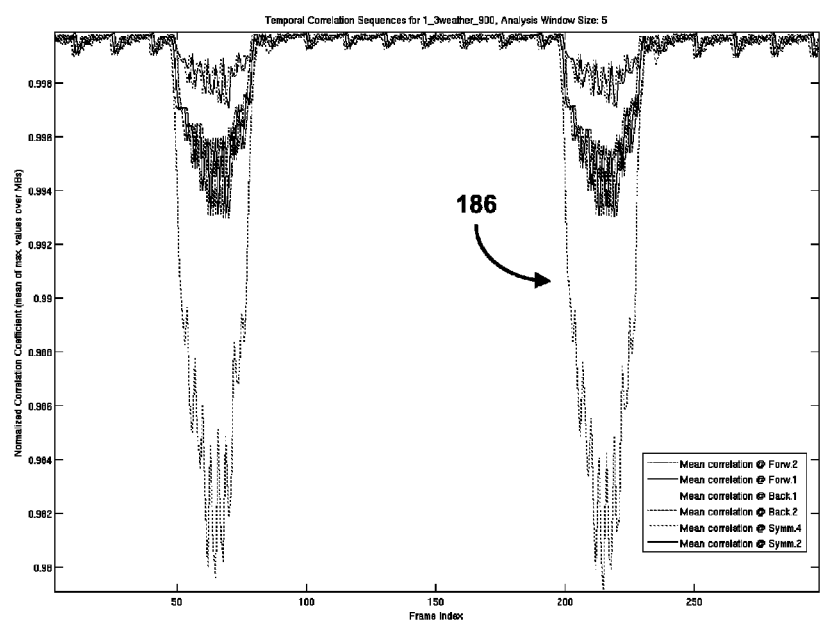
FIG. 19 is a plot illustrating output of the extended support event detector from FIG. 13 including a cross-fade fingerprint.

FIG. 19 is a plot illustrating output of extended support event detector 114 from FIG. 13 including a cross-fade fingerprint 186. A cross-fade may occur when a video sequence frame content gradually changes from one video scene to a different video scene due to a change in content, e.g., a weather map changing from one region of the country to another. Therefore, cross-fade fingerprint 186 comprises notches of low correlation between frames such that these notches in different cross-correlation time series are temporally aligned in a specific order due to the gradual change of video scene.

Figure 20A:
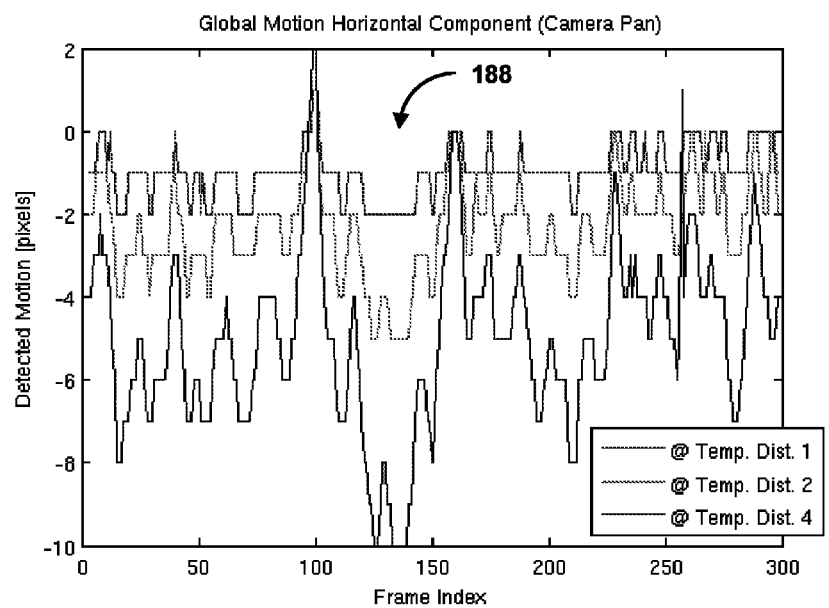
FIGS. 20A and 20B are plots illustrating output of the global motion detector from FIG. 14 including a camera pan fingerprint and a camera scroll fingerprint.
Figure 20B:
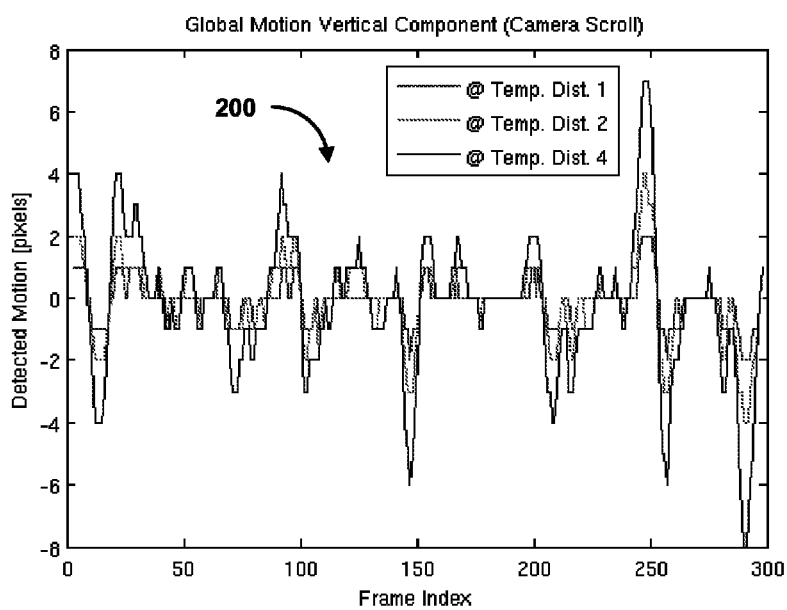

FIGS. 20A and 20B are plots illustrating output of global motion detector 116 including a camera pan fingerprint 188 and a camera scroll fingerprint 200. A camera pan may occur when a video sequence frame content gradually changes from one video scene to a different video scene due to horizontal movement of the video camera. As illustrated in FIG. 18A, camera pan fingerprint 188 comprises a consistently present significant shift or deviation from a value of 0 in the horizontal component of the detected motion, i.e., a consistently present significant horizontal shift from the origin in the maximum cross-correlation value location, due to the gradual global translational change of video scene. The amounts of said shifts depend on the amount of motion as well as the temporal distance, i.e., the particular first order cross-correlation time series, the shifts are observed or estimated through. In FIG. 20A, average shifts of approximately −1.5 pixels, −3 pixels, and −6 pixels can be observed at temporal distances of 1, 2, and 4 frame intervals, respectively.

A camera scroll may occur when a video sequence frame content gradually changes from one video scene to a different video scene due to vertical movement of the video camera. As illustrated in FIG. 20B, camera scroll fingerprint 200 comprises a consistently present significant shift or deviation from a value of 0 in the vertical component of the detected motion, i.e., a consistently present significant vertical shift from the origin in the cross-correlation peak location, due to the gradual global translational change of video scene. The amounts of said shifts depend on the amount of motion as well as the temporal distance, i.e., the particular first order cross-correlation time series, the shifts are observed or estimated through. In FIG. 20B, for example the earliest dip. i.e., negative deviation from 0, observed around frame indices 10 to 16 correspond to average shifts of −1, −2, and −4 pixels at temporal distances of 1, 2, and 4 frame intervals, respectively. During this time interval the video camera experienced a sudden short vertical displacement possibly due to a brief shake.

The techniques of this disclosure are directed to determining a picture type for each of a plurality of frames included in a video sequence based on cross-correlations between the frames. More specifically, the techniques are directed to adaptively determining picture types for frames included in a GOP structure based on cross-correlations between the frames. The cross-correlations include first order cross-correlations between image information within pairs of frames included in the video sequence and second order cross-correlations between pairs of the first order cross-correlations. The first order cross-correlations may be analyzed to detect video transitional effects between the frames. The first and second order cross-correlations may be comparatively analyzed to determine temporal similarities between neighboring frames. Therefore, the correlation-based determination techniques determine picture types for the frames based on the video transitional effects and the temporal similarities.

The correlation-based determination techniques may calculate the first order cross-correlations between images within pairs of frames, or between sets of subimages, e.g., macroblocks, within pairs of frames whose statistics e.g., maximum values, are then averaged over all or a portion of the subimages for each of the pairs of frames. The techniques described herein may be executed within a correlation-based AGOP structure determination module utilized by a transcoder for re-encoding of video data with an encoding standard that provides efficient inter-frame and intra-frame compression, such as ITU-T H.264. In one aspect, the correlation-based AGOP structure determination module may be used as an offline benchmark against which other AGOP structure determination methods implemented in a real-time transcoder may be compared. In another aspect, the correlation-based AGOP structure determination module with appropriate complexity reductions may be implemented in a real-time transcoder. In other aspects, the correlation-based AGOP structure determination module may be utilized in a single-pass or multi-pass, real-time or non-real-time video encoder for encoding of previously uncompressed raw video data with an encoding standard that provides efficient inter-frame and intra-frame compression, such as ITU-T H.264.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in hardware, the techniques may be realized using digital hardware, analog hardware or a combination thereof. If implemented in software, the techniques may be realized at least in part by one or more stored or transmitted instructions or code on a computer-readable medium of a computer program product. Computer-readable media may include computer storage media, communication media, or both, and may include any medium that facilitates transfer of a computer program from one place to another. A storage media may be any available media that can be accessed by a computer. A computer program product may include packaging materials.

By way of example, and not limitation, such computer-readable media can comprise RAM, such as synchronous dynamic random access memory (SDRAM), read-only memory (ROM), non-volatile random access memory (NVRAM), programmable read-only memory PROM, erasable programmable read-only memory (EPROM), electrically erasable programmable read-only memory (EEPROM), FLASH memory, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a network cable, coaxial cable, fiber optic cable, twisted pair, digital subscriber line (DSL), or wireless technologies such as infrared, radio, and microwave, then the network cable, coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable gate arrays (FPGAs, also known as field programmable logic arrays, FPLAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Nevertheless, various modifications may be made to the techniques described without departing from the scope of the following claims.

The invention claimed is:

1. A method comprising:
calculating first order cross-correlations between image information within pairs of frames included in a video sequence, wherein the first order cross-correlations provide a first measure of at least one of similarity and movement between the pairs of frames;
calculating second order cross-correlations between pairs of the first order cross-correlations, wherein the second order cross-correlations provide a second measure of at least one of similarity and movement between the frames of the video sequence; and
determining a picture type for each of the frames included in the video sequence based on a comparison of the first order cross-correlations to the second order cross-correlations.

2. The method of claim 1, wherein determining the picture type for each of the frames comprises determining whether each of the frames included in the video sequence should be encoded as an intra picture, a predicted picture, or a bi-predictive picture.

3. The method of claim 1, wherein determining the picture type for each of the frames further comprises:
detecting video transitional effects between the frames included in the video sequence by identifying features included in output of the first order cross-correlations as video effect fingerprints.

4. The method of claim 3, wherein detecting video transitional effects comprises detecting one or more compact support video transitional effects based on the first order cross-correlations, wherein the compact support video transitional effects include cut scene change video effects, partial scene change video effects, and flash frame video effects, and wherein detecting the one or more compact support video transitional effects comprises:
applying output of the first order cross-correlations to filters matched to the compact support video transitional effects that detect a plurality of features within the output that are substantially similar to compact support video effect fingerprints; and
applying output of the matched filters to threshold comparators that identify which of the detected features are compact support video effect fingerprints.

5. The method of claim 3, wherein detecting video transitional effects comprises detecting one or more extended support video transitional effects based on the first order cross-correlations, wherein the extended support video transitional effects include cross-fade video effects, fade-in video effects, fade-out video effects, zoom-in video effects and zoom-out video effects, and wherein detecting the one or more extended support video transitional effects comprises:
applying output of the first order cross-correlations to multi-resolution analyzers that detect a plurality of features within the output that are substantially similar to extended support video effect fingerprints; and
applying output of the multi-resolution analyzers to a structured significant peak analyzer that identifies which of the detected features are extended support video effect fingerprints.

6. The method of claim 3, wherein detecting video transitional effects comprises detecting one or more global motion video transitional effects based on the first order cross-correlations, wherein the global motion video transitional effects include camera pan video effects and camera scroll video effects, and wherein detecting the one or more global motion video transitional effects comprises:
applying output of the first order cross-correlations to max location filters that detect a plurality of features within the output that are substantially similar to global motion video effect fingerprints and determine horizontal and vertical displacement estimates for each of the features; and
applying output of the max location filters to a multi-channel fusion module that smoothes the horizontal and vertical displacement estimates for each of the detected features and identifies which of the detected features are global motion video effect fingerprints.

7. The method of claim 1, further comprising evaluating accuracy of the determined picture types for each of the frames included in the video sequence based on dependency on frame content, rate-distortion improvement characteristics, and encoding bandwidth regime characteristics.

8. The method of claim 1, further comprising partitioning the video sequence into group of pictures (GOP) structures including a plurality of frames, wherein determining a picture type for each of the frames comprises:
positioning an analysis window within the GOP structures such that the analysis window is centered at a candidate frame and includes a predetermined number of neighboring frames;
calculating first order cross-correlations between image information of frames included in the analysis window;
calculating second order cross-correlations between pairs of the first order cross-correlations included in the analysis window; and
determining a picture type for the candidate frame based on the first and second order cross-correlations.

9. The method of claim 1,
wherein calculating first order cross-correlations comprises performing two-dimensional Fast Fourier Transform-based calculations between image information within pairs of frames included in the video sequence, and
wherein calculating second order cross-correlations comprises performing two-dimensional Fast Fourier Transform-based calculations between pairs of first order cross-correlations.

10. The method of claim 1, wherein calculating first order cross-correlations comprises calculating first order cross-correlations between full frame images within pairs of frames included in the video sequence.

11. The method of claim 1, wherein calculating first order cross-correlations comprises:
padding subimages in sets of subimages within pairs of frames included in the video sequence to a common image size;
calculating first-order subimage cross-correlations between the sets of subimages; and
averaging the subimage cross-correlations over at least a portion of the subimages for each of the pairs of frames.

12. The method of claim 11, wherein determining a picture type for each of the frames comprises:
dividing each of the frames included in the video sequence into multiple slices; and
determining picture types for the individual slices of each of the frames included in the video sequence based on the first and second order cross-correlations.

13. The method of claim 1, wherein determining picture types for each of the frames comprises determining benchmark picture types for each of the frames included in the video sequence, further comprising comparing picture types determined in real-time against the benchmark picture types to determine accuracy of the picture types determined in real-time.

14. The method of claim 1, wherein determining picture types for each of the frames comprises determining picture types in real-time for each of the frames included in the video sequence.

15. The method of claim 14, further comprising performing complexity reductions to enable real-time determination of the picture types.

16. The method of claim 1, further comprising encoding each of the frames included in the video sequence based on the picture type determined for the frame.

17. A device comprising:
a correlator that calculates first order cross-correlations between image information within pairs of frames included in a video sequence, wherein the first order cross-correlations provide a first measure of at least one of similarity and movement between the pairs of frames, and calculates second order cross-correlations between pairs of the first order cross-correlations, wherein the second order cross-correlations provide a second measure of at least one of similarity and movement between the frames of the video sequence; and a picture type determination module that determines a picture type for each of the frames included in the video sequence based on a comparison of the first order cross-correlations to the second order cross-correlations.

18. The device of claim 17, wherein the picture type determination module determines whether each of the frames included in the video sequence should be encoded as an intra picture, a predicted picture, or a bi-predictive picture.

19. The device of claim 17, further comprising a correlation analyzer that includes:

a video transitional effect detector that detects video transitional effects between the frames included in the video sequence based on features included in output of the first order cross-correlations identified as video effect fingerprints.

20. The device of claim 19, wherein the video transitional effect detector includes:

a compact support event detector that detects one or more compact support video transitional effects based on the first order cross-correlations, wherein the compact support video transitional effects include cut scene change video effects, partial scene change video effects, and flash frame video effects, and wherein the compact support event detector comprises:

filters matched to the compact support video transitional effects that detect a plurality of features within output of the first order cross-correlations that are substantially similar to compact support video effect fingerprints; and threshold comparators that identify which of the detected features in output of the matched filters are compact support video effect fingerprints.

21. The device of claim 19, wherein the video transitional effect detector includes:

an extended support event detector that detects one or more extended support video transitional effects based on the first order cross-correlations, wherein the extended support video transitional effects include cross-fade video effects, fade-in video effects, fade-out video effect, zoom-in video effects and zoom-out video effects, and wherein the extended support event detector comprises:

multi-resolution analyzers that detect a plurality of features within output of the first order cross-correlations that are substantially similar to extended support video effect fingerprints; and a structured significant peak analyzer that identifies which of the detected features in output of the multi-resolution analyzers are extended support video effect fingerprints.

22. The device of claim 19, wherein the video transitional effect detector includes:

a global motion detector that detects one or more global motion video transitional effects based on the first order cross-correlations, wherein the global motion video transitional effects include camera pan video effects and camera scroll video effects, and wherein the global motion detector comprises:

max location filters that detect a plurality of features within output of the first order cross-correlations that are substantially similar to global motion video effect fingerprints and determine horizontal and vertical displacement estimates for each of the features; and a multi-channel fusion module that smoothes the horizontal and vertical displacement estimates for each of the detected features in output of the max location filters and identifies which of the detected features are global motion video effect fingerprints.

23. The device of claim 17, further comprising an evaluation module that evaluates accuracy of the picture types determined by the picture type determination module for each of the frames included in the video sequence based on dependency on frame content, rate-distortion improvement characteristics, and encoding bandwidth regime characteristics.

24. The device of claim 17, further comprising:

a group of pictures (GOP) partitioner that partitions the video sequence into GOP structures including a plurality of frames; and an analysis window positioning module that positions an analysis window within the GOP structures such that the analysis window is centered at a candidate frame and includes a predetermined number of neighboring frames, wherein the correlator calculates first order cross-correlations between image information of frames included in the analysis window and calculates second order cross-correlations between pairs of the first order cross-correlations included in the analysis window, and wherein the picture type determination module determines a picture type for the candidate frame based on the first and second order cross-correlations.

25. The device of claim 17, wherein the correlator performs two-dimensional Fast Fourier Transform-based calculations between image information within pairs of frames included in the video sequence to generate the first order cross-correlations, and performs two-dimensional Fast Fourier Transform-based calculations between pairs of first order cross-correlations to generate the second order cross-correlations.

26. The device of claim 17, wherein the correlator calculates first order cross-correlations between full frame images within pairs of frames included in the video sequence.

27. The device of claim 17, wherein the correlator:

pads subimages in sets of subimages within pairs of frames included in the video sequence to a common image size;

calculates first order subimage cross-correlations between the sets of subimages; and averages the subimage cross-correlations over at least a portion of the subimages for each of the pairs of frames to generate the first order cross-correlations.

28. The device of claim 27, wherein the picture type determination module:

divides each of the frames included in the video sequence into multiple slices; and determines picture types for the individual slices of each of the frames included in the video sequence based on the first and second order cross-correlations.

29. The device of claim 17, wherein the picture type determination module determines benchmark picture types for each of the frames included in the video sequence for comparison against picture types determined in real-time to determine accuracy of the picture types determined in real-time.

30. The device of claim 17, wherein the picture type determination module determines picture types in real-time for each of the frames included in the video sequence.

31. The device of claim 30, further comprising a complexity reduction module that performs complexity reductions to enable the picture type determination module to perform real-time determination of the picture types.

32. The device of claim 17, further comprising an encoder that encodes each of the frames included in the video sequence based on the picture type determined for the frame.

33. A computer program product comprising a non-transitory computer-readable medium comprising instructions for causing a computer to:
calculate first order cross-correlations between image information within pairs of frames included in a video sequence, wherein the first order cross-correlations provide a first measure of at least one of similarity and movement between the pairs of frames;
calculate second order cross-correlations between pairs of the first order cross-correlations, wherein the second order cross-correlations provide a second measure of at least one of similarity and movement between the frames of the video sequence; and
determine a picture type for each of the frames included in the video sequence based on a comparison of the first order cross-correlations to the second order cross-correlations.

34. The computer program product comprising non-transitory computer-readable medium of claim 33, wherein the instructions cause the computer to determine whether each of the frames included in the video sequence should be encoded as an intra picture, a predicted picture, or a bi-predictive picture.

35. The computer program product comprising non-transitory computer-readable medium of claim 33, wherein the instructions cause the computer to:
detect video transitional effects between the frames included in the video sequence based on features included in output of the first order cross-correlations identified as video effect fingerprints.

36. The computer program product comprising non-transitory computer-readable medium of claim 35, wherein the instructions cause the computer to detect one or more compact support video transitional effects based on the first order cross-correlations, wherein the compact support video transitional effects include cut scene change video effects, partial scene change video effects, and flash frame video effects, and wherein the instructions that cause the computer to detect one or more compact support video transitional effects cause the computer to:
apply output of the first order cross-correlations to filters matched to the compact support video transitional effects that detect a plurality of features within the output that are substantially similar to compact support video effect fingerprints; and
apply output of the matched filters to threshold comparators that identify which of the detected features are compact support video effect fingerprints.

37. The computer program product comprising non-transitory computer-readable medium of claim 35, wherein the instructions cause the computer to detect one or more extended support video transitional effects based on the first order cross-correlations, wherein the extended support video transitional effects include cross-fade video effects, fade-in video effects, fade-out video effects, zoom-in video effects and zoom-out video effects, and wherein the instructions that cause the computer to detect the one or more extended support video transitional effects cause the computer to:
apply output of the first order cross-correlations to multi-resolution analyzers that detect a plurality of features within the output that are substantially similar to extended support video effect fingerprints; and
apply output of the multi-resolution analyzers to a structured significant peak analyzer that identifies which of the detected features are extended support video effect fingerprints.

38. The computer program product comprising non-transitory computer-readable medium of claim 35, wherein the instructions cause the computer to detect one or more global motion video transitional effects based on the first order cross-correlations, wherein the global motion video transitional effects include camera pan video effects and camera scroll video effects, and wherein the instructions that cause the computer to detect the one or more global motion video transitional effects cause the computer to:
apply output of the first order cross-correlations to max location filters that detect a plurality of features within the output that are substantially similar to global motion video effect fingerprints and determine horizontal and vertical displacement estimates for each of the features; and
apply output of the max location filters to a multi-channel fusion module that smoothes the horizontal and vertical displacement estimates for each of the detected features and identifies which of the detected features are global motion video effect fingerprints.

39. The computer program product comprising non-transitory computer-readable medium of claim 33, further comprising instructions that cause the computer to evaluate accuracy of the determined picture types for each of the frames included in the video sequence based on dependency on frame content, rate-distortion improvement characteristics, and encoding bandwidth regime characteristics.

40. The computer program product comprising non-transitory computer-readable medium of claim 33, further comprising instructions that cause the computer to:
partition the video sequence into group of pictures (GOP) structures including a plurality of frames;
position an analysis window within the GOP structures such that the analysis window is centered at a candidate frame and includes a predetermined number of neighboring frames;
calculate first order cross-correlations between image information of frames included in the analysis window;
calculate second order cross-correlations between pairs of the first order cross-correlations included in the analysis window; and
determine a picture type for the candidate frame based on the first and second order cross-correlations.

41. The computer program product comprising non-transitory computer-readable medium of claim 33, wherein the instructions cause the computer to:
perform two-dimensional Fast Fourier Transform-based calculations between image information within pairs of frames included in the video sequence to generate the first order cross-correlations, and
perform two-dimensional Fast Fourier Transform-based calculations between pairs of first order cross-correlations to generate the second order cross-correlations.

42. The computer program product comprising non-transitory computer-readable medium of claim 33, wherein the instructions cause the computer to calculate first order cross-correlations between full frame images within pairs of frames included in the video sequence.

43. The computer program product comprising non-transitory computer-readable medium of claim 33, wherein the instructions cause the computer to:
pad subimages in the sets of subimages within pairs of frames included in the video sequence to a common image size;
calculate first order subimage cross-correlations between the sets of subimages; and
average the subimage cross-correlations over at least a portion of the subimages for each of the pairs of frames to generate the first order cross-correlations.

44. The computer program product comprising non-transitory computer-readable medium of claim 43, wherein the instructions cause the computer to:
divide each of the frames included in the video sequence into multiple slices; and
determine picture types for the individual slices of each of the frames included in the video sequence based on the first and second order cross-correlations.

45. The computer program product comprising non-transitory computer-readable medium of claim 33, wherein the instructions cause the computer to determine benchmark picture types for each of the frames included in the video sequence, and compare picture types determined in real-time against the benchmark picture types to determine accuracy of the picture types determined in real-time.

46. The computer program product comprising non-transitory computer-readable medium of claim 33, wherein the instructions cause the computer to determine picture types in real-time for each of the frames included in the video sequence.

47. The computer program product comprising non-transitory computer-readable medium of claim 46, wherein the instructions cause the computer to perform complexity reductions to enable real-time determination of the picture types.

48. The computer program product comprising non-transitory computer-readable medium of claim 33, further comprising instructions that cause the computer to encode each of the frames included in the video sequence based on the picture type determined for the frame.

49. A device comprising:
means for calculating first order cross-correlations between image information within pairs of frames included in a video sequence, wherein the first order cross-correlations provide a first measure of at least one of similarity and movement between the pairs of frames, and second order cross-correlations between pairs of the first order cross-correlations, wherein the second order cross-correlations provide a second measure of at least one of similarity and movement between the frames of the video sequence; and
means for determining a picture type for each of the frames included in the video sequence based on a comparison of the first order cross-correlations to the second order cross-correlations.

50. The device of claim 49, wherein the means for determining the picture type determines whether each of the frames included in the video sequence should be encoded as an intra picture, a predicted picture, or a bi-predictive picture.

51. The device of claim 49, further comprising:
means for detecting video transitional effects between the frames included in the video sequence based on features included in output of the first order cross-correlations identified as video effect fingerprints.

52. The device of claim 51, wherein the means for detecting video transitional effects includes means for detecting one or more compact support video transitional effects based on the first order cross-correlations, wherein the compact support video transitional effects include cut scene change video effects, partial scene change video effects, and flash frame video effects, and wherein the means for detecting one or more compact support video transitional effects comprises:
filters matched to the compact support video transitional effects that detect a plurality of features within output of the first order cross-correlations that are substantially similar to compact support video effect fingerprints; and
threshold comparators that identify which of the detected features in output of the matched filters are compact support video effect fingerprints.

53. The device of claim 51, wherein the means for detecting video transitional effects includes means for detecting one or more extended support video transitional effects based on the first order cross-correlations, wherein extended support video transitional effects include cross-fade video effects, fade-in video effects, fade-out video effects, zoom-in video effects and zoom-out video effects, and wherein the means for detecting one or more extended support video transitional effects comprises:
multi-resolution analyzers that detect a plurality of features within output of the first order cross-correlations that are substantially similar to extended support video effect fingerprints; and
a structured significant peak analyzer that identifies which of the detected features in output of the multi-resolution analyzers are extended support video effect fingerprints.

54. The device of claim 51, wherein the means for detecting video transitional effects includes means for detecting one or more global motion video transitional effects based on the first order cross-correlations, wherein global motion video transitional effects include camera pan video effects and camera scroll video effects, and wherein the means for detecting the one or more global motion video transitional effects comprises:
max location filters that detect a plurality of features within output of the first order cross-correlations that are substantially similar to global motion video effect fingerprints and determine horizontal and vertical displacement estimates for each of the features; and
a multi-channel fusion module that smoothes the horizontal and vertical displacement estimates for each of the detected features in output of the max location filters and identifies which of the detected features are global motion video effect fingerprints.

55. The device of claim 49, further comprising means for evaluating accuracy of the determined picture types for each of the frames included in the video sequence based on dependency on frame content, rate-distortion improvement characteristics, and encoding bandwidth regime characteristics.

56. The device of claim 49, further comprising:
means for partitioning the video sequence into GOP structures including a plurality of frames; and
means for positioning an analysis window within the GOP structures such that the analysis window is centered at a candidate frame and includes a predetermined number of neighboring frames, wherein the means for calculating calculates first order cross-correlations between image information of frames included in the analysis window and calculates second order cross-correlations between pairs of the first order cross-correlations included in the analysis window, and wherein the means for determining a picture type determines a picture type for the candidate frame based on the first and second order cross-correlations.

57. The device of claim 49, wherein the means for calculating performs two-dimensional Fast Fourier Transform-based calculations between image information within pairs of frames included in the video sequence to generate the first order cross-correlations, and performs two-dimensional Fast Fourier Transform-based calculations between pairs of first order cross-correlations to generate the second order cross-correlations.

58. The device of claim 49, wherein the means for calculating calculates first order cross-correlations between full frame images within pairs of frames included in the video sequence.

59. The device of claim 49, wherein the means for calculating:
pads subimages in sets of subimages within pairs of frames included in the video sequence to a common image size;
calculates first order subimage cross-correlations between the sets of subimages; and
averages the subimage cross-correlations over at least a portion of the subimages for each of the pairs of frames to generate the first order cross-correlations.

60. The device of claim 59, wherein the means for determining a picture type:
divides each of the frames included in the video sequence into multiple slices; and
determines picture types for the individual slices of each of the frames included in the video sequence based on the first and second order cross-correlations.

61. The device of claim 49, wherein the means for determining a picture type determines benchmark picture types for each of the frames included in the video sequence for comparison against picture types determined in real-time to determine accuracy of the picture types determined in real-time.

62. The device of claim 49, wherein the means for determining a picture type determines picture types in real-time for each of the frames included in the video sequence.

63. The device of claim 62, further comprising means for performing complexity reductions to enable the picture type determination module to perform real-time determination of the picture types.

64. The device of claim 49, further comprising means for encoding each of the frames included in the video sequence based on the picture type determined for the frame.

65. The wireless communication device handset comprising:
a correlator that calculates first order cross-correlations between image information within pairs of frames included in a video sequence, wherein the first order cross-correlations provide a first measure of at least one of similarity and movement between the pairs of frames, and calculates second order cross-correlations between pairs of the first order cross-correlations, wherein the second order cross-correlations provide a second measure of at least one of similarity and movement between the frames of the video sequence; and a picture type determination module that determines a picture type for each of the frames included in the video sequence based on a comparison of the first order cross-correlations to the second order cross-correlations.

66. The handset of claim 65, wherein the picture type determination module determines whether each of the frames included in the video sequence should be encoded as an intra picture, a predicted picture, or a bi-predictive picture.

67. The handset of claim 65, further comprising a correlation analyzer that includes:
a video transitional effect detector that detects video transitional effects between the frames included in the video sequence based on features included in output of the first order cross-correlations identified as video effect fingerprints.

68. The handset of claim 67, wherein the video transitional effect detector includes:
a compact support event detector that detects one or more compact support video transitional effects based on the first order cross-correlations, wherein the compact support video transitional effects include cut scene change video effects, partial scene change video effects, and flash frame video effects, and wherein the compact support event detector comprises:
filters matched to the compact support video transitional effects that detect a plurality of features within output of the first order cross-correlations that are substantially similar to compact support video effect fingerprints; and
threshold comparators that identify which of the detected features in output of the matched filters are compact support video effect fingerprints.

69. The handset of claim 67, wherein the video transitional effect detector includes:
an extended support event detector that detects one or more extended support video transitional effects based on the first order cross-correlations, wherein the extended support video transitional effects include cross-fade video effects, fade-in video effects, fade-out video effect, zoom-in video effects and zoom-out video effects, and wherein the extended support event detector comprises:
multi-resolution analyzers that detect a plurality of features within output of the first order cross-correlations that are substantially similar to extended support video effect fingerprints; and
a structured significant peak analyzer that identifies which of the detected features in output of the multi-resolution analyzers are extended support video effect fingerprints.

70. The handset of claim 67, wherein the video transitional effect detector includes:
a global motion detector that detects one or more global motion video transitional effects based on the first order cross-correlations, wherein the global motion video transitional effects include camera pan video effects and camera scroll video effects, and wherein the global motion detector comprises:
max location filters that detect a plurality of features within output of the first order cross-correlations that are substantially similar to global motion video effect fingerprints and determine horizontal and vertical displacement estimates for each of the features; and
a multi-channel fusion module that smoothes the horizontal and vertical displacement estimates for each of the detected features in output of the max location filters and identifies which of the detected features are global motion video effect fingerprints.

71. The handset of claim 65, further comprising an evaluation module that evaluates accuracy of the picture types determined by the picture type determination module for each of the frames included in the video sequence based on dependency on frame content, rate-distortion improvement characteristics, and encoding bandwidth regime characteristics.

72. The handset of claim 65, further comprising:
a group of pictures (GOP) partitioner that partitions the video sequence into GOP structures including a plurality of frames; and
an analysis window positioning module that positions an analysis window within the GOP structures such that the analysis window is centered at a candidate frame and includes a predetermined number of neighboring frames,
wherein the correlator calculates first order cross-correlations between image information of frames included in the analysis window and calculates second order cross-correlations between pairs of the first order cross-correlations included in the analysis window, and
wherein the picture type determination module determines a picture type for the candidate frame based on the first and second order cross-correlations.

73. The handset of claim 65, wherein the correlator performs two-dimensional Fast Fourier Transform-based calculations between image information within pairs of frames included in the video sequence to generate the first order cross-correlations, and performs two-dimensional Fast Fourier Transform-based calculations between pairs of first order cross-correlations to generate the second order cross-correlations.

74. The handset of claim 65, wherein the correlator calculates first order cross-correlations between full frame images within pairs of frames included in the video sequence.

75. The handset of claim 65, wherein the correlator:
pads subimages in sets of subimages within pairs of frames included in the video sequence to a common image size;
calculates first order subimage cross-correlations between the sets of subimages; and
averages the subimage cross-correlations over at least a portion of the subimages for each of the pairs of frames to generate the first order cross-correlations.

76. The handset of claim 75, wherein the picture type determination module:
divides each of the frames included in the video sequence into multiple slices; and
determines picture types for the individual slices of each of the frames included in the video sequence based on the first and second order cross-correlations.

77. The handset of claim 65, wherein the picture type determination module determines picture types in real-time for each of the frames included in the video sequence.

78. The handset of claim 77, further comprising a complexity reduction module that performs complexity reductions to enable the picture type determination module to perform real-time determination of the picture types.

79. The handset of claim 65, further comprising an encoder that encodes each of the frames included in the video sequence based on the picture type determined for the frame.

80. An integrated circuit device for processing digital image data comprising at least one processor that is configured to:
calculate first order cross-correlations between image information within pairs of frames included in a video sequence, wherein the first order cross-correlations provide a first measure of at least one of similarity and movement between the pairs of frames;
calculate second order cross-correlations between pairs of the first order cross-correlations, wherein the second order cross-correlations provide a second measure of at least one of similarity and movement between the frames of the video sequence; and
determine a picture type for each of the frames included in the video sequence based on a comparison of the first order cross-correlations to the second order cross-correlations.

81. The integrated circuit device of claim 80 wherein the at least one processor is configured to determine whether each of the frames included in the video sequence should be encoded as an intra picture, a predicted picture, or a bi-predictive picture.

82. The integrated circuit device of claim 80, wherein the at least one processor is configured to:
detect video transitional effects between the frames included in the video sequence based on features included in output of the first order cross-correlations identified as video effect fingerprints.

83. The integrated circuit device of claim 82, wherein the at least one processor is configured to detect one or more compact support video transitional effects based on the first order cross-correlations, wherein the compact support video transitional effects include cut scene change video effects, partial scene change video effects, and flash frame video effects, and wherein the at least one processor is configured to:
apply output of the first order cross-correlations to filters matched to the compact support video transitional effects that detect a plurality of features within the output that are substantially similar to compact support video effect fingerprints; and
apply output of the matched filters to threshold comparators that identify which of the detected features are compact support video effect fingerprints.

84. The integrated circuit device of claim 82, wherein the at least one processor is configured to detect one or more extended support video transitional effects based on the first order cross-correlations, wherein the extended support video transitional effects include cross-fade video effects, fade-in video effects, fade-out video effects, zoom-in video effects and zoom-out video effects, and wherein the at least one processor is configured to:
apply output of the first order cross-correlations to multi-resolution analyzers that detect a plurality of features within the output that are substantially similar to extended support video effect fingerprints; and
apply output of the multi-resolution analyzers to a structured significant peak analyzer that identifies which of the detected features are extended support video effect fingerprints.

85. The integrated circuit device of claim 82, wherein the at least one processor is configured to detect one or more global motion video transitional effects based on the first order cross-correlations, wherein the global motion video transitional effects include camera pan video effects and camera scroll video effects, and wherein the at least one processor is configured to:

apply output of the first order cross-correlations to max location filters that detect a plurality of features within the output that are substantially similar to global motion video effect fingerprints and determine horizontal and vertical displacement estimates for each of the features; and apply output of the max location filters to a multi-channel fusion module that smoothes the horizontal and vertical displacement estimates for each of the detected features and identifies which of the detected features are global motion video effect fingerprints.

86. The integrated circuit device of claim 80, wherein the at least one processor is configured to evaluate accuracy of the determined picture types for each of the frames included in the video sequence based on dependency on frame content, rate-distortion improvement characteristics, and encoding bandwidth regime characteristics.

87. The integrated circuit device of claim 80, wherein the at least one processor is configured to:

partition the video sequence into group of pictures (GOP) structures including a plurality of frames;

position an analysis window within the GOP structures such that the analysis window is centered at a candidate frame and includes a predetermined number of neighboring frames;

calculate first order cross-correlations between image information of frames included in the analysis window;

calculate second order cross-correlations between pairs of the first order cross-correlations included in the analysis window; and determine a picture type for the candidate frame based on the first and second order cross-correlations.

88. The integrated circuit device of claim 80, wherein the at least one processor is configured to:

perform two-dimensional Fast Fourier Transform-based calculations between image information within pairs of frames included in the video sequence to generate the first order cross-correlations, and perform two-dimensional Fast Fourier Transform-based calculations between pairs of first order cross-correlations to generate the second order cross-correlations.

89. The integrated circuit device of claim 80, wherein the at least one processor is configured to calculate first order cross-correlations between full frame images within pairs of frames included in the video sequence.

90. The integrated circuit device of claim 80, wherein the at least one processor is configured to:

pad subimages in the sets of subimages within pairs of frames included in the video sequence to a common image size;

calculate first order subimage cross-correlations between the sets of subimages; and average the subimage cross-correlations over at least a portion of the subimages for each of the pairs of frames to generate the first order cross-correlations.

91. The integrated circuit device of claim 90, wherein the at least one processor is configured to:

divide each of the frames included in the video sequence into multiple slices; and determine picture types for the individual slices of each of the frames included in the video sequence based on the first and second order cross-correlations.

92. The integrated circuit device of claim 80, wherein the at least one processor is configured to determine benchmark picture types for each of the frames included in the video sequence, and compare picture types determined in real-time against the benchmark picture types to determine accuracy of the picture types determined in real-time.

93. The integrated circuit device of claim 80, wherein the at least one processor is configured to determine picture types in real-time for each of the frames included in the video sequence.

94. The integrated circuit device of claim 93, wherein the at least one processor is configured to perform complexity reductions to enable real-time determination of the picture types.

95. The integrated circuit device of claim 80, wherein the at least one processor is configured to encode each of the frames included in the video sequence based on the picture type determined for the frame.

96. A system comprising:

a coding device including a group of pictures (GOP) partitioner that partitions video data into GOP structures including a plurality of frames, and an adaptive group of pictures (AGOP) structure determination module that determines picture types for the frames included in the GOP structures in real-time;

a correlation-based AGOP structure determination module positioned external to the coding device that determines benchmark picture types for the frames included in the GOP structures based on a comparison between first order cross-correlations between image information within pairs of frames, wherein the first order cross-correlations provide a first measure of at least one of similarity and movement between the pairs of frames, and second order cross-correlations between pairs of first order cross-correlations, wherein the second order cross-correlations provide a second measure of at least one of similarity and movement between the frames of the video sequence; and a benchmark comparator that compares the picture types against the benchmark picture types to determine accuracy of the AGOP structure determination module integrated in the coding device.

97. The system of claim 96, wherein the coding device comprises one of a transcoder or an encoder.

98. A coding device comprising:

a group of pictures (GOP) partitioner that partitions video data into GOP structures including a plurality of frames; and a correlation-based adaptive group of pictures (AGOP) structure determination module that determines picture types for the frames included in the GOP structures in real-time based on a comparison between first order cross-correlations between image information within pairs of frames, wherein the first order cross-correlations provide a first measure of at least one of similarity and movement between the pairs of frames, and second order cross-correlations between pairs of first order cross-correlations, wherein the second order cross-correlations provide a second measure of at least one of similarity and movement between the frames of the video sequence.

99. The coding device of claim 98, further comprising a complexity reduction module that at least one of reduces resolution of image information within the frames included in the GOP structures and limits the number of first order cross-correlations calculated by the correlation-based AGOP structure determination module.

100. The coding device of claim 98, wherein the device comprises one of a transcoder or an encoder.

* * * * *